United States Patent [19]
Fukushima

[11] Patent Number: 5,526,474
[45] Date of Patent: Jun. 11, 1996

[54] IMAGE DRAWING WITH IMPROVED PROCESS FOR AREA RATIO OF PIXEL

[75] Inventor: Tokutaro Fukushima, Sagamihara, Japan

[73] Assignee: Ricoh Company, Ltd., Tokyo, Japan

[21] Appl. No.: 965,062

[22] Filed: Oct. 22, 1992

[30]      Foreign Application Priority Data

Oct. 28, 1991   [JP]   Japan ................................ 3-308407

[51] Int. Cl.[6] ............................................... E06F 15/68
[52] U.S. Cl. ................................................... 395/143
[58] Field of Search ................................ 395/141, 142, 395/143, 150, 151; 345/135, 136, 16, 17, 18

[56]           References Cited
           U.S. PATENT DOCUMENTS

| | | | |
|---|---|---|---|
| 5,123,085 | 6/1992 | Wells et al. | 395/121 |
| 5,220,650 | 6/1993 | Barkans | 395/163 |
| 5,237,650 | 8/1993 | Priem et al. | 395/143 |

*Primary Examiner*—Phu K. Nguyen
*Attorney, Agent, or Firm*—Lowe, Price, LeBlanc & Becker

[57]           ABSTRACT

An area ratio calculation device calculates an area ratio of a pixel constituting an image corresponding to supplied image data if the area ratio corresponding to the supplied image data has not yet been stored in an area ratio storing device, the area ratio corresponding to an area occupied by the image corresponding to the supplied image data. The area ratio is stored in an area ratio storing device. An image drawing device draws an image corresponding to supplied image data by providing a pixel darkness value corresponding to the area ratio of a pixel constituting the image corresponding to the supplied image data, the area ratio being obtained by reference to the area ratio storing device if the area ratio of a pixel constituting an image identical to the image corresponding to the supplied image data has already been stored in the area ratio storing device, or the area ratio being obtained as a result of calculation by means of the area ratio calculation device if the area ratio of a pixel constituting an image identical to the image corresponding to the supplied image data has not been stored in the area ratio storing device.

22 Claims, 21 Drawing Sheets

INPUT DATA FOR FIFO 1201

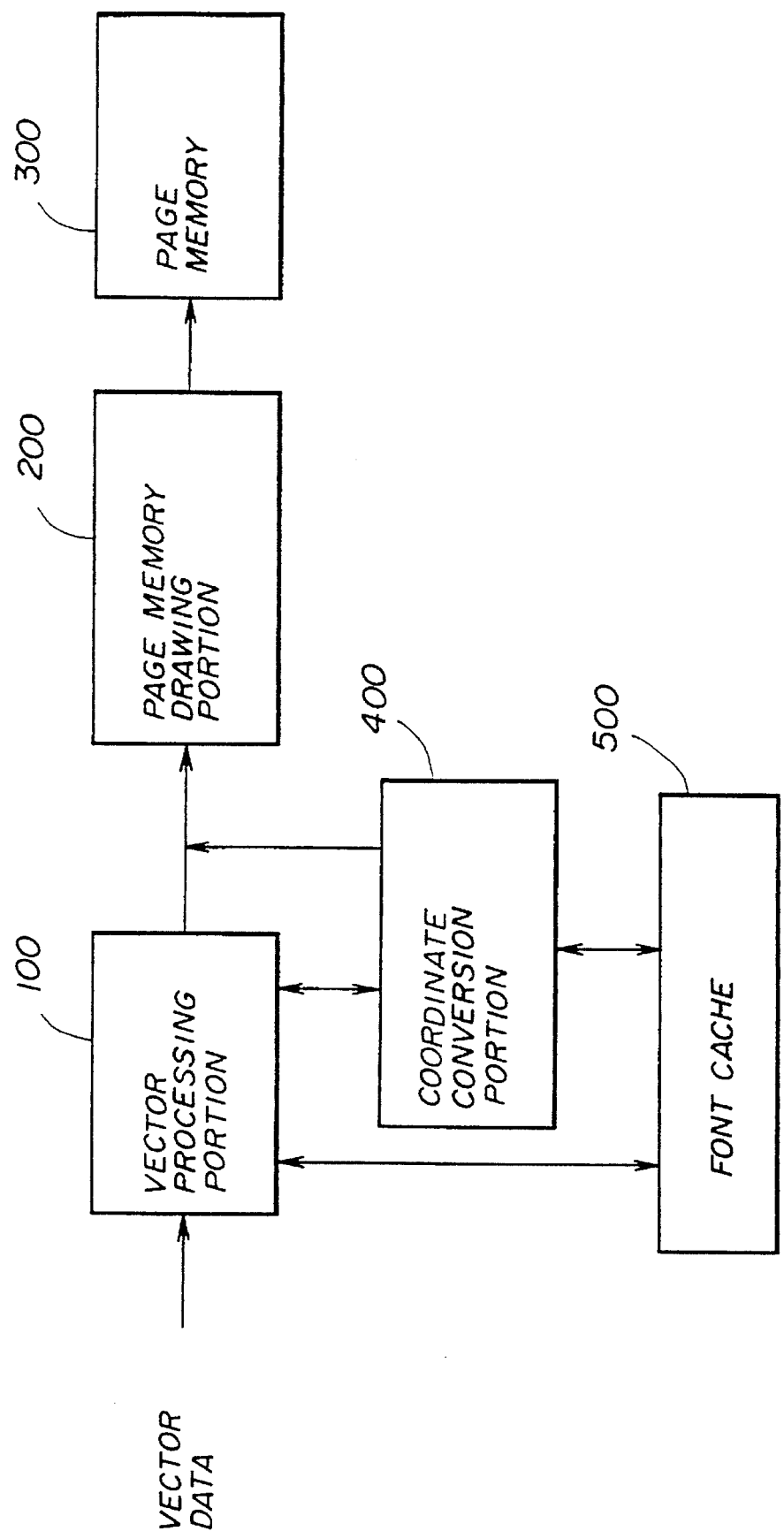

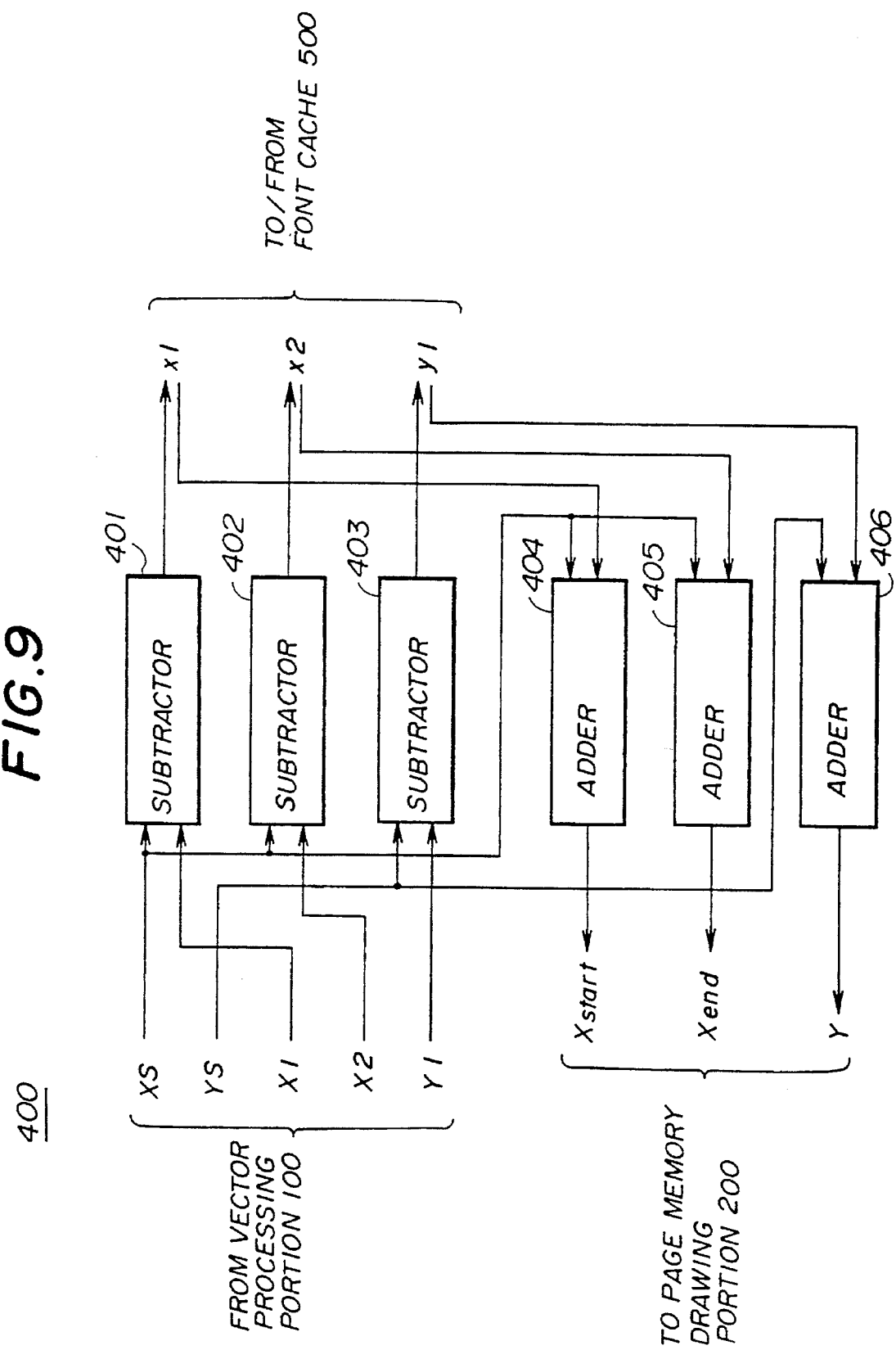

FIG.10

| VECTOR | MAIN-SCAN START COORDINATE | MAIN-SCAN END COORDINATE | SUB-SCAN COORDINATE | AREA RATIO |
|---|---|---|---|---|
| | ⋮ | ⋮ | ⋮ | ⋮ |
| A | 0 | 0 | 0 | KS |
| | -1 | -1 | 1 | K11 |
| | 0 | 0 | 1 | K12 |
| | -1 | -1 | 2 | K21 |
| | 0 | 0 | 2 | K22 |
| | 1 | 1 | 2 | K23 |
| | -2 | -2 | 3 | K31 |
| | -1 | -1 | 3 | K32 |
| | 0 | 0 | 3 | 1 |
| | 1 | 1 | 3 | K34 |
| | -4 | -4 | 4 | K41 |
| | -3 | -3 | 4 | K42 |
| | -2 | 0 | 4 | 1 |
| | 1 | 1 | 4 | K46 |
| | ⋮ | ⋮ | ⋮ | ⋮ |
| A (POINTER PT) | XE−XS | XE−XS | YE−YS | KE |
| | | | | |
| | ⋮ | ⋮ | ⋮ | ⋮ |

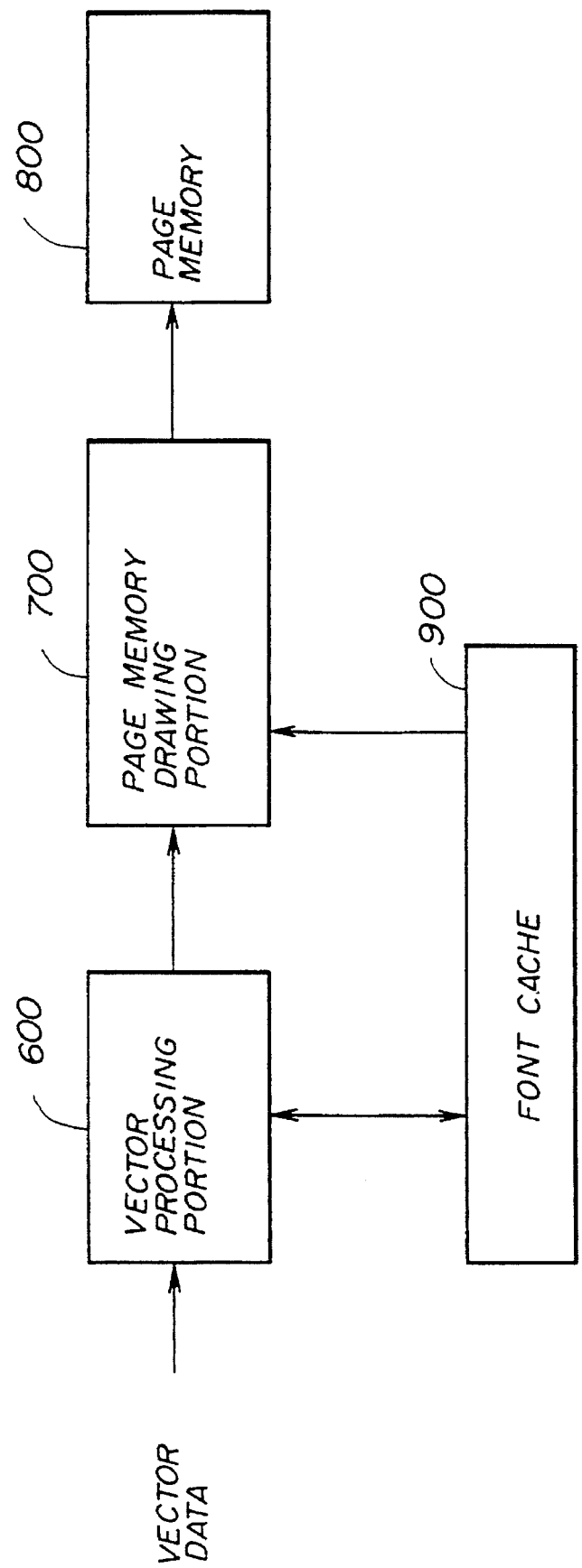

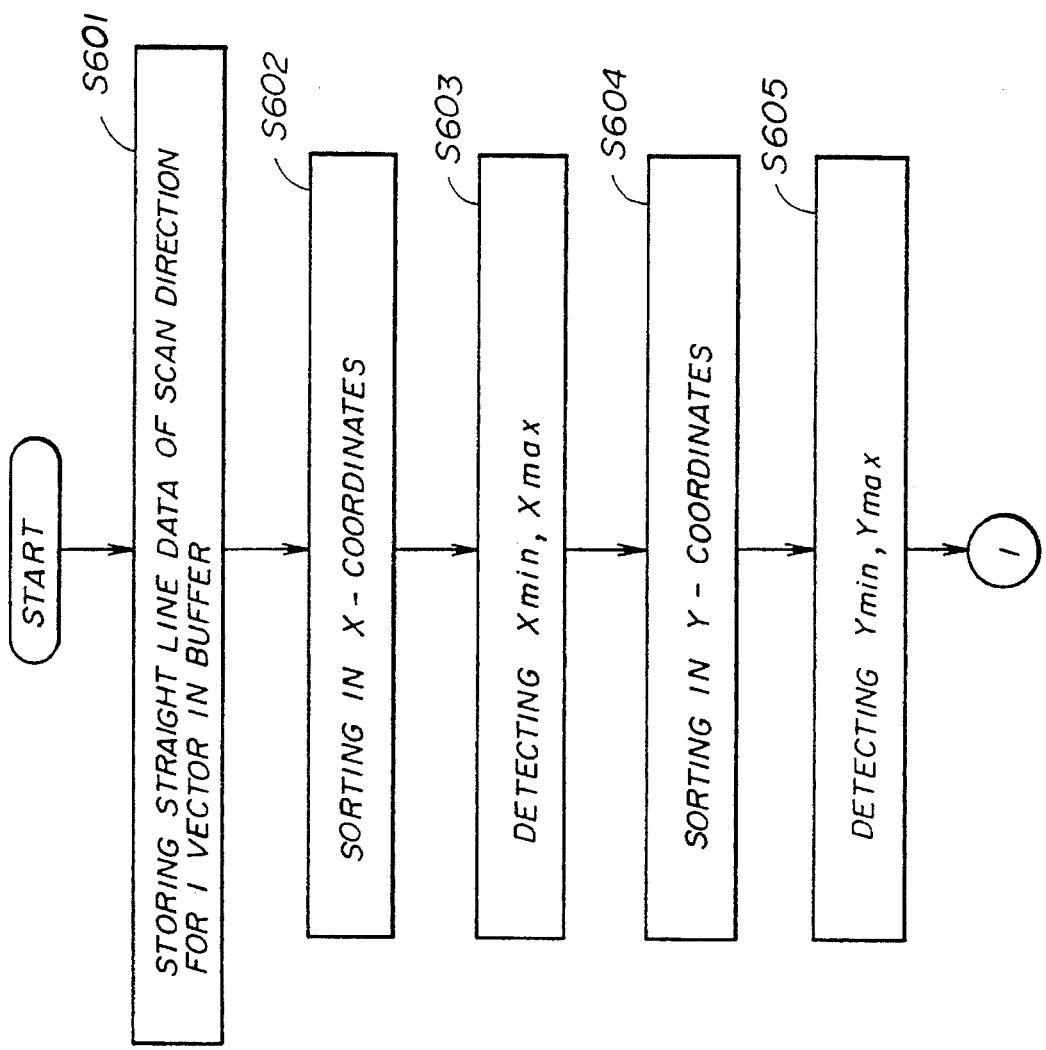

FIG.13B

| | X1 Xmin | X2 | X3 | X4 | X5 | X6 | X7 | X8 Xmax |
|---|---|---|---|---|---|---|---|---|
| Y1 Ymin | K11 | K12 | K13 | K14 | K15 | K16 | K17 | 0 |
| Y2 | 0 | K22 | K23 | 0 | K25 | K26 | K27 | 0 |
| Y3 | 0 | K32 | K33 | 0 | 0 | K36 | K37 | 0 |
| Y4 | 0 | K42 | K43 | K44 | K45 | K46 | K47 | 0 |
| Y5 | 0 | K52 | K53 | K54 | K55 | K56 | K57 | 0 |
| Y6 | 0 | K62 | K63 | 0 | 0 | K66 | K67 | K68 |
| Y7 | 0 | K72 | K73 | 0 | 0 | K76 | K77 | K78 |
| Y8 Ymax | K81 | K82 | K83 | K84 | K85 | K86 | K87 | 0 |

| VECTOR | AREA RATIO |
|---|---|
| ⋮ | ⋮ |
| B | K11 |
|  | K12 |
|  | K13 |
|  | ⋮ |
|  | K17 |
|  | 0 |
|  | 0 |
|  | K22 |
|  | ⋮ |
| ↓ | K87 |
| B | 0 |
|  |  |
| ⋮ | ⋮ |

POINTER PT →

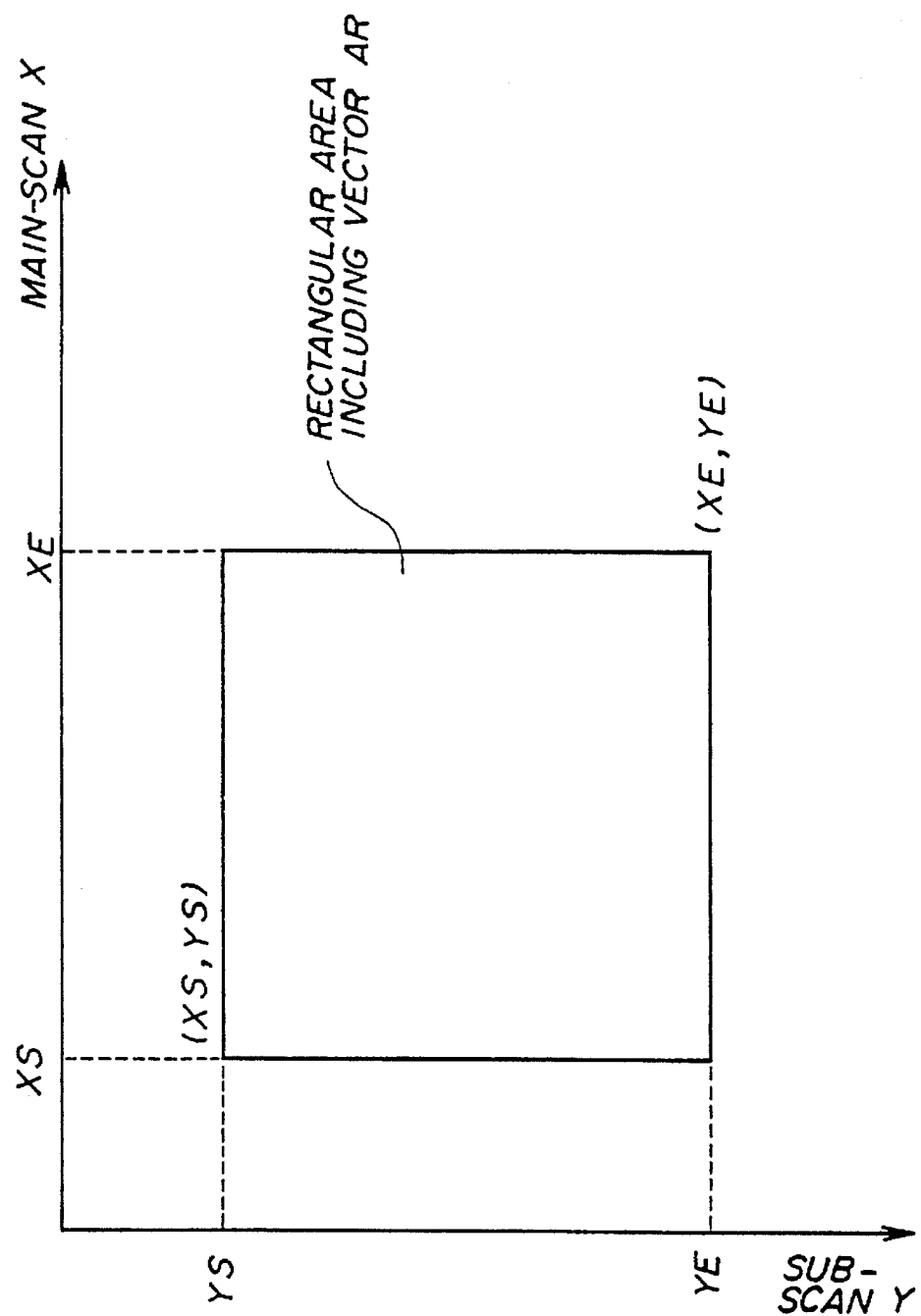

IMAGE DRAWING WITH IMPROVED PROCESS FOR AREA RATIO OF PIXEL

BACKGROUND OF THE INVENTION

The present invention relates to an image drawing apparatus and method. One example of such an image drawing apparatus and method is a vector image drawing apparatus for providing a vector image described in a PDL language or by other methods. The present invention particularly relates to an image drawing apparatus and method (a vector image drawing apparatus) having a high speed anti-aliasing process. The word "vector" means a line (this can be a straight line or a curved line) having a direction, a length, and a position. The words "a vector image" mean an image comprising such a vector or vectors, hereinafter. A vector comprising a straight line is called "a straight line vector" and a vector comprising a curved line is called "a curved line vector", hereinafter.

Recently, a vector image printing system has come to be used in various fields, which vector image is treated in a computer graphics process. A reason for this is that so-called DTP (desk top publishing, meaning a publishing system utilizing a personal computer) has come into wide use. A typical example of that vector image printing system is a system using the "postscript" (a trade name) of Adobe Systems Incorporated (U.S.A.). "Postscript" belongs to a language group called page description languages referred to as PDL hereinafter) which are programming languages for describing the form of the contents of a page of a document. The form includes text (a part comprising characters) and graphics both of which are included in the page of the document, and the form also includes the arrangement and style of the text and graphics. A vector font is used as the character font for such a system as mentioned above.

Using such a vector font can improve the character printing quality very much even when the character size is enlarged or reduced by various factors, in comparison with a system such as one using a bit-map font (for example, a word processor in the related art). This enlargement and reduction respectively includes enlargement or reduction in the vertical direction only or the horizontal direction only and enlargement or reduction so that the enlargement or reduction ratios in the vertical direction and the horizontal direction are different from each other. Further, using such a vector font enables printing such that character fonts and graphics are combined together.

However, most laser printers or other printing apparatus used for such systems have resolutions of not finer than 240 dpi (dots per inch) through 400 dpi. Such a coarse resolution may cause undesirable jaggedness or "stair-step" (shaped like steps of a stair) to appear on an edge of a printed figure. Such a phenomena is called "aliasing" An anti-aliasing process is used to obtain a mope attractive (having a smooth edge) character printing image. The process is such that a darkness modulation is performed for a part where such a stair-step jaggedness) appears on an edge, a character printing image which appears smooth to the eye thus can be obtained. The words "darkness modulation" mean that the darkness of each pixel is controlled depending on a below mentioned area ratio.

An example of a vector image drawing apparatus in the related art (this is referred to as art related to the present invention hereinafter) is described below with reference to FIG. 1. Generally speaking, such a vector image drawing apparatus uses application software of computer or other data processors, and a document (vector data) described by PDL language is supplied to the apparatus, the apparatus then expands the vector data into multivalue image data, and the apparatus then provides such data to an output apparatus such as a multi-value color laser printer.

The word "multi-value" (used in words "multi-value image data" and "multi-value page memory") means that each pixel's darkness is one of multitone darkness, for example, 255 tones of darkness between white and black. This word "multi-value" is in contrast to another word "two-value" which means that each pixel's darkness is one of two tone of darkness, 10 for example, white and black, respectively represented by the binary numerals "0" and "1".

Firstly, a document is formed, such as described by PDL language using application software of computer or other data processors. Letters and graphics constituting such a formed document are treated as vector data, and such characters and graphics are then supplied to a vector processing portion 1100 in FIG. 1. The vector processing portion 1100 then converts the vector data into straight line data, the portion 1100 then performs an anti-aliasing process on the data, and the portion 1100 provides data such as an area ratio and the straight line data to a page memory drawing portion 1200. The words "straight line data" mean image drawing data arranged for each scan line. The page memory drawing portion 1200 then determines darkness values of particular pixels by using such data provided by the vector data processing portion 1100, the portion 1200 then writes the darkness values of pixels as multi-value image data onto page memory 1300. The page memory 1300, then, after completion of storing of such image data corresponding to one page as a result of writing by the page memory drawing portion 1200, transfers the stored image data in an output apparatus (not shown in FIG. 1) such as a laser printer, and the image corresponding to the image data is then printed via the output apparatus.

FIG. 2 shows a method for approximation of a curved line vector by straight line vectors (this approximation is referred to as "straight line approximation" hereinafter) if vector data supplied to the vector processing portion 1100 is a curved line vector. The distance "h" is that between the midpoint t=½) and a point "p" on the curved line R which is obtained from PDL language. This midpoint is that of the line segment $D_0$ between a starting point (t=0) and an ending point (t=1) of the curved line R. The point "p" on the curved line R is that the nearest to the above mentioned mid point of the line segment $D_0$.

A straight line approximation is performed so that vector data corresponding to the curved line R is approximated by straight lines $D_1$ and $D_2$ if "h" is determined as shorter then a predetermined allowable error as a result of comparing "h" and the predetermined allowable error. The straight line $D_1$ is a line segment between the point "t=0" and the point "p", and the straight line $D_2$ is a line segment between the point "t=1" and the point "p".

On the other hand, if the distance "h" is longer than the allowable error, then the next trial is to approximate two curved lines, produced as a result of dividing the curved line R at the point "p", into four straight lines. The first curved line is that between the point "t=0" and "p" via $P_1$. The second curved line is that between the points "p" and "t=1" via "$P_2$". The four straight lines are line segments between respective two points "t=0" and "$P_1$"; "$P_1$" and "p" (both corresponding to the first curved line); "p" and "$P_2$"; and $P_2$ and "t=1" (both corresponding to the second curved line). This trial is successful if both distances "$h_1$" and "$h_2$" are respectively shorter than the allowable error, otherwise a next trial should be performed similarly. Such a process, which should be repeated as necessary as mentioned above, enables a straight line approximation.

Further, the vector processing portion 1100 performs the anti-aliasing process on the edge parts of the vector data, all curved line vectors included in which vector data has been approximated by corresponding straight line vectors as mentioned above, and the portion 1100 also performs the conversion of the vector data into a straight line data for the scanning direction, as shown in FIGS. 3 and 4A through 4C.

In an arbitrary coordinates area $Y_n$ corresponding to a sub-scanning direction, which coordinate area extends horizontally in FIG. 3, a vector V (three edges constituting a triangle) passes through respective pixels $P_{n*n}$, $P(n+1)*n$, and $P_{m*n}$ respectively located in coordinates areas $X_n$, $X_{n+1}$, and $X_m$ corresponding to a main-scanning direction. Pixels such as $P_{n*n}$, $P(n+1)*n$, and $P_{m*n}$ are referred to as "edge portion pixels". Thus, an anti-aliasing process should be performed on these edge portion pixels $P_{n*n}$, $P(n+1)*n$, and $P_{m*n}$. An area ratio calculating method for an anti-aliasing process is described with reference to FIGS. 4A through 4C.

FIGS. 4A through 4C show magnified views of the Yn coordinates area. Each pixel is divided into nine (9) sub-pixels (3 rows and 3 columns sub-pixel division in this example), and sub-pixels including the edge of the vector V and sub-pixels surrounded by the edges are defined as "with-data sub-pixels (Pd)", then the number of with-data sub-pixels Pd in each pixel is determined. An area ratio for each pixel thus can be obtained as the result of division of the number of with-data sub-pixels Pd by the total number of sub-pixels (nine in the example) per pixel. For example, the number of with-data sub-pixels Pd in the pixel $P_{m*n}$ is seven (7), the area ratio of the pixel $P_{m*n}$ is then obtained by the division of 7/9. The area ratio obtained as mentioned above, the corresponding coordinates, and a reference figure darkness value of each pixel are respectively supplied to the page memory drawing portion 1200. The word "reference figure darkness value" means a reference darkness value given, for example, by an operator at his request, and each darkness level constituting an image to be drawn is determined respectively based on the reference figure darkness value.

On the other hand, pixels corresponding to a range $X_{n+1}<X<X_m$ in the $Y_n$ coordinates area which are not "edge part pixels" should be printed according to the reference figure darkness value without any alteration, which values are provided in PDL language. A painting-out-in-darkness printing process (scan-line conversion) such that a corresponding whole area is painted out with one darkness should be performed on this range of pixels. Thus, the following data is sent from the vector processing portion 1100 to the page memory drawing portion 1200: starting and ending X-coordinates respectively corresponding to pixels where painting-out-in-darkness printing process should be started and ended; corresponding Y-coordinates ($Y_n$ in this example); and the reference figure darkness value. Further, vector data is converted into straight line data for the scanning direction simultaneously by such an operation as mentioned above.

The composition of data sent from the vector processing portion 1100 to the page memory drawing portion 1200 is described below with reference to FIG. 5. The data comprises the following six (6) kinds of data: command data Ds for direction writing in the page memory, D data Dd for describing a reference figure darkness value, K data Dk for describing an area ratio, XS data Dxs for describing starting coordinates in the main-scanning direction, XE data Dxe for describing ending coordinates in the main-scanning direction, and Y data Dy for describing coordinates in the sub-scanning direction. Further, each item of data has a TAG bit describing the kind of the data.

The composition of the page memory drawing portion 1200 is described below with reference to FIG. 6. All data supplied from the vector processing portion 1100 to the page memory drawing portion 1200 are applied through FIFO 1201. The TAG bit is determined by TAG decode 1207. Then a determination of 10 whether or not an anti-aliasing process should be performed on the data is executed, then a distribution of the data into each register of D register 1202, K register 1203, XS register 1204, XE register 1205, and Y register 1206 is executed.

If an anti-aliasing process should be performed, LUT- (look up table) 1208 multiplies the area ratio latched in the K register 1203 by the reference figure darkness value latched in the D register 1202 for each pixel. Another LUT 1209 reads the darkness value (background color darkness) which has been previously written (painted) for a pixel in the page memory 1300, then $K_0$($K_0$=1−(area ratio)) is multiplied by the background color darkness. Further, an adder 1210 then adds the results of the multiplications of both LUT 1208 and 1209 together. If an overflow arises during such addition, the result of the addition is set to be the maximum darkness value all bits are "1").

That is, a calculation of the following equation (1) by using read-modify-write-accessing with the page memory 1300, which calculation is the darkness-determination process of the anti-aliasing, is executed (the symbol "*", represents a multiplication of the immediate left value with the immediate right value hereinafter): (darkness value of a printer) ={(reference figure darkness value) * (area ratio)}+ [(background color) * {1−(area ratio)}] (1) The words "read-modify-write-accessing" mean reading data from an address in memory and writing the data to the address in memory after modifying the data.

A printer darkness value obtained as mentioned above is written in the page memory 1300 at an address directed by the respective coordinates of the main-scanning direction and the sub-scanning direction. In the case of a painting-out-in-darkness process of a scan-line, X address counter 1212 counts from a starting address XS to an ending address XE in the main-scanning direction, the counter 1212 increments the address one by one with synchronization to pixel clocks provided from a clock generator 1213, and then the counter 1212 executes a painting-out-in-darkness process for each pixel successively (in the example of FIGS. 4A through 4C, XS =$X_{n+2}$, XE=$X_{m-1}$). A selector 1211 is then switched so that darkness values provided from the D register 1202 can be written without alteration to the page memory 1300 for the painting-out-in-darkness process for a scan-line.

The above mentioned processing is completed for all vector data for one page. Thus an image for the page is written in the page memory 1300. Then, after a printing command in PDL language is executed, the page memory 1300 sends stored image data (multivalue image data) to an output apparatus such as a multi-value color laser printer or other printer, thus printing via the output apparatus.

Problems arising in a vector image drawing apparatus such as mentioned above are described below. A first problem is that much time is taken for the sub-pixel painting-out-in-darkness process in the anti-aliasing process and the area ratio calculation a calculation for obtaining an area ratio) process. This results in a limitation on a processing speed. A second problem is that a method such as executing a sub-pixel painting-out-in-darkness process and an area ratio calculation process by using software by means of a CPU results in an increased load applied on the CPU.

SUMMARY OF THE INVENTION

An object of the present invention is to provide an image drawing apparatus and method resulting in an improvement of process speed and eliminating heavy loading of a CPU.

To achieve the object an image drawing apparatus according to the present invention comprises:

area ratio calculation means for calculating an area ratio of a pixel constituting an image corresponding to supplied image data if the area ratio corresponding to the supplied image data has not been stored in an area ratio storing means yet, where the area ratio corresponds to an area occupied by the image represented by the supplied image data;

area ratio storing means for storing the area ratio therein;

image drawing means for drawing an image corresponding to supplied image data by providing a pixel darkness value corresponding to an area ratio of a pixel constituting the image represented by the supplied image data, the area ratio being obtained with reference to the area ratio storing means if the area ratio of a pixel constituting an identical image to the image represented by the supplied image data has been already stored in the area ratio storing means, or the area ratio being obtained as a result of calculation by means of the area ratio calculation means if an area ratio of a pixel constituting identical image to the image represented by the supplied image data has not been stored in the area ratio storing means.

In the composition as mentioned above, an area ratio once calculated by the area ratio calculation means is stored in the area ratio storing means and the area ratio stored in the area ratio storing means is used for drawing an image which is the same as that already drawn so that a duplicated calculation of an area ratio can be eliminated. Thus, an improvement of process speed and reduced loading of a CPU can be realized.

Other objects and further features of the present invention will be more apparent from the following detailed description when read in conjunction with the accompanying drawings.

BRIEF DESCRIPTION OF THE DRAWINGS

FIG. 7 shows a block diagram of a vector image drawing apparatus of a first embodiment according to the present invention;

FIG. 9 shows a block diagram of a coordinates conversion portion);

FIG. 10 shows an illustration of the composition of cache information stored in a font cache of the first embodiment according to the present invention;

FIG. 11 shows a block diagram of a vector image drawing apparatus of a second embodiment according to the present invention;

FIGS. 12 and 12B show operation flow charts of a bit-map expansion;

FIGS. 13A and 13B respectively show an illustration of one example of vector data and an illustration of an area ratio for each pixel;

FIG. 16 shows an illustration showing two points (XS, YS) and (XE, YE) of a rectangular area.

DESCRIPTION OF THE PREFERRED EMBODIMENTS

Figure 1:
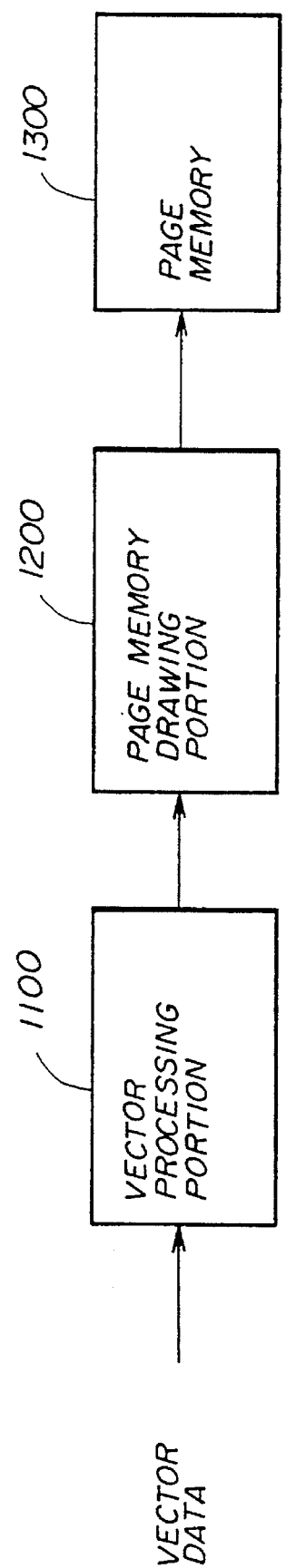
FIG. 1 shows a block diagram of one example of a vector image drawing apparatus in an art related to the present invention.
Figure 2:
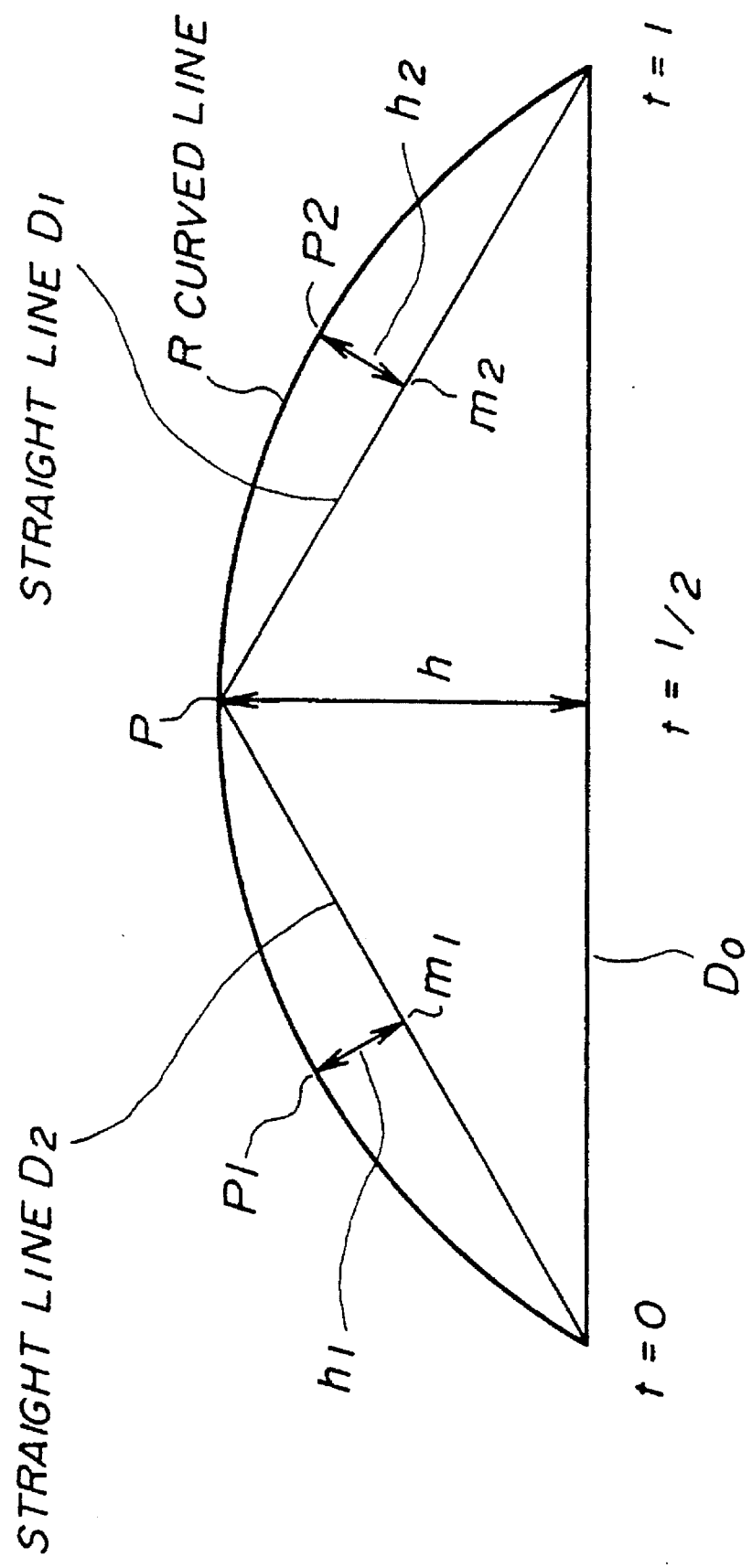
FIG. 2 shows an illustration of a method of approximation of a curved line vector by a straight line vector.
Figure 3:
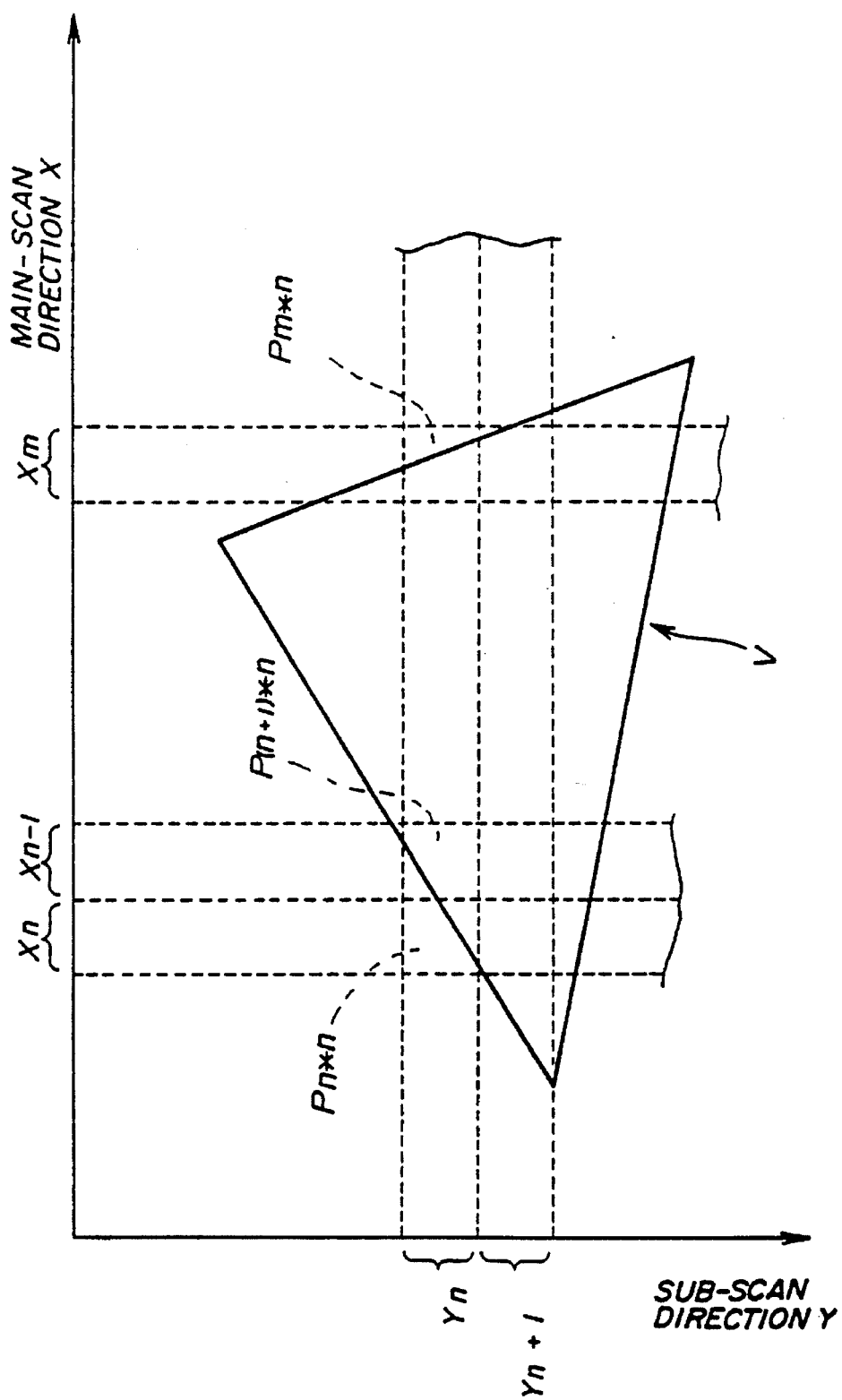
FIG. 3 shows an illustration of aliasing processing on edge parts and conversion into straight line data for the scanning direction.
Figure 4A:
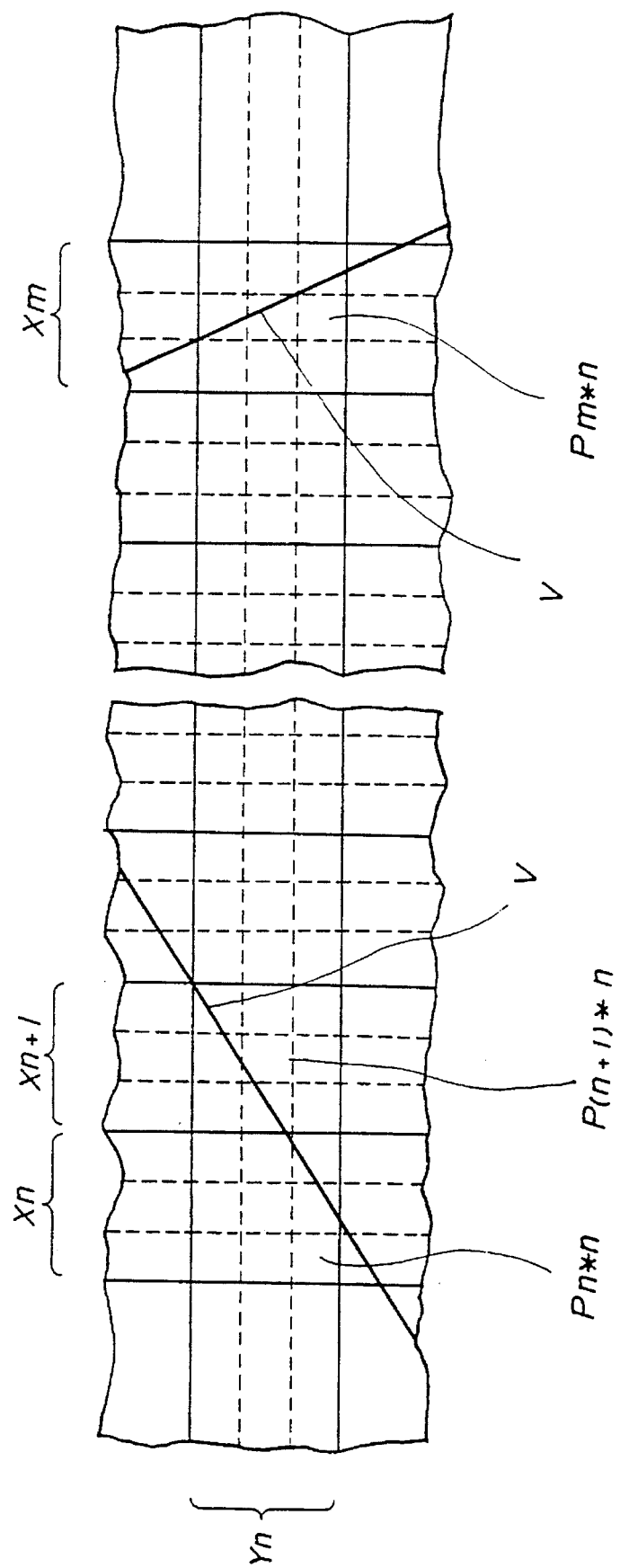
FIGS. 4A, 4B, and 4C show illustrations of an aliasing processing on edge parts and conversion into straight line data for the scanning direction.
Figure 4B:
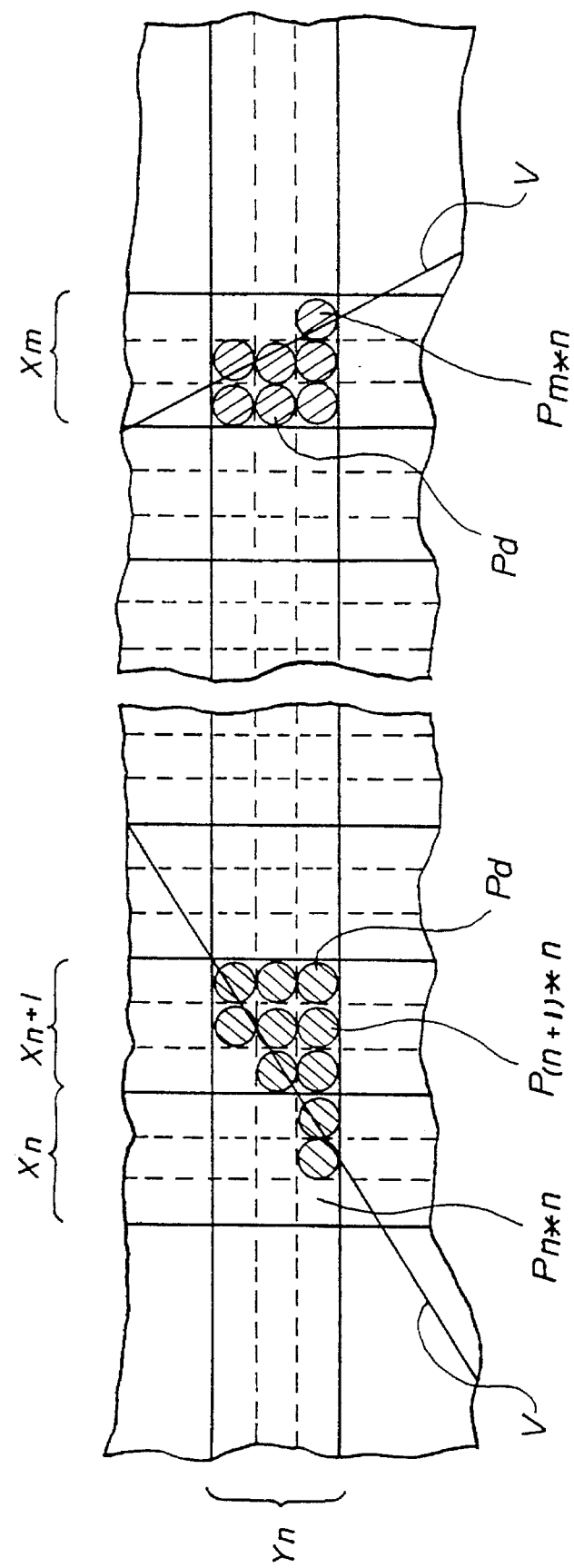
Figure 4C:
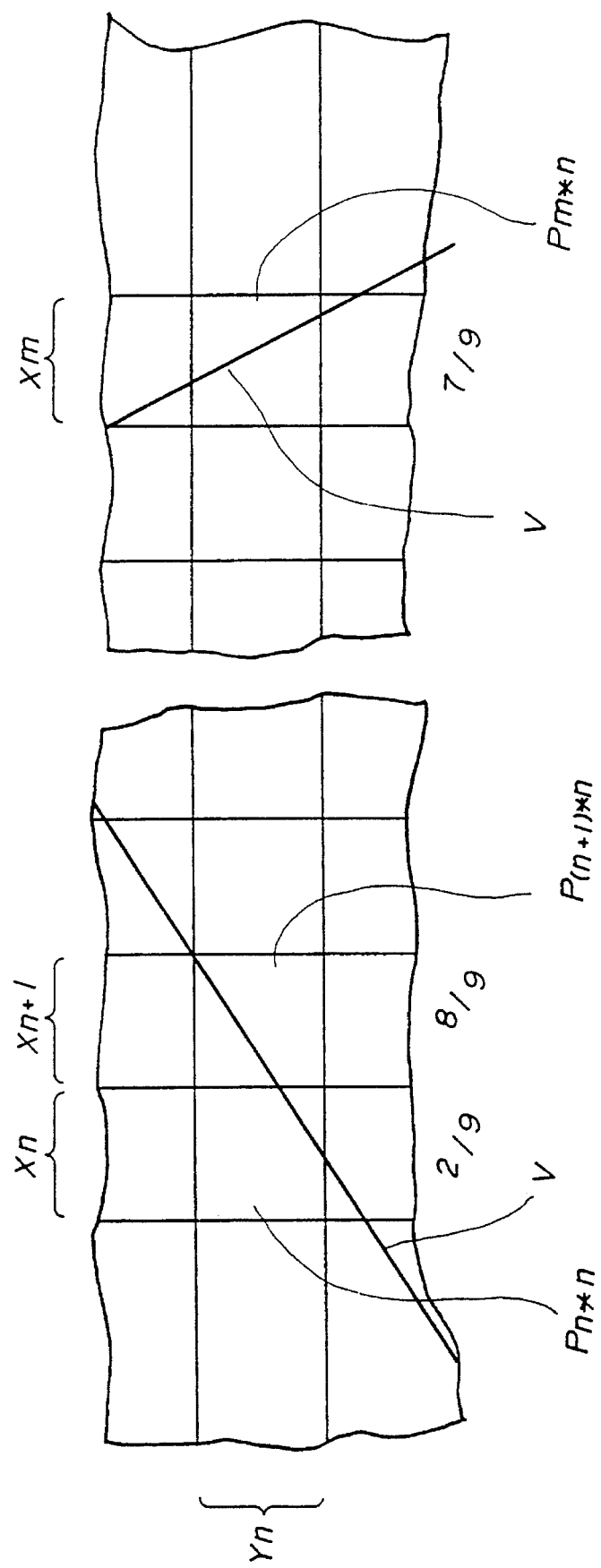
Figure 5:
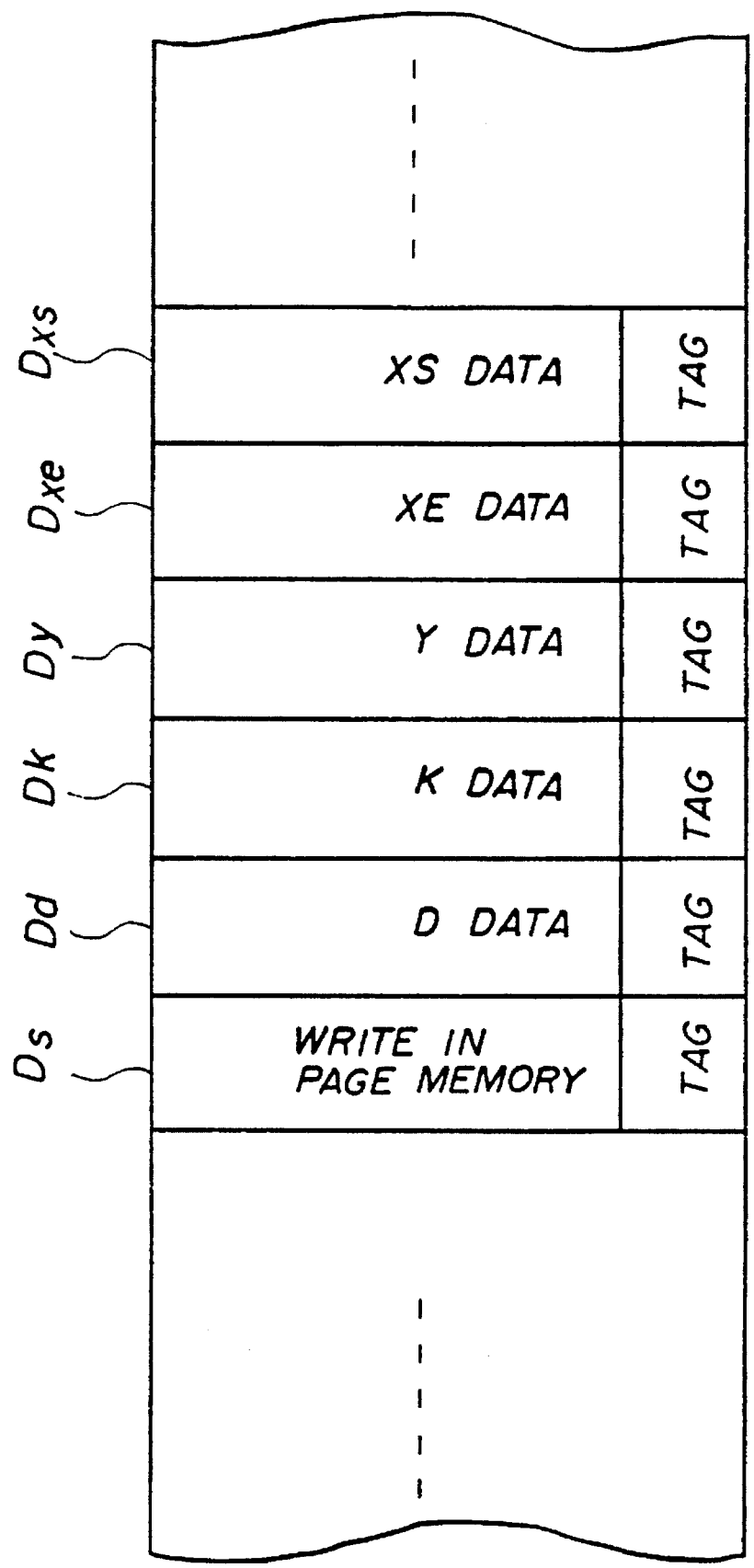
FIG. 5 shows an illustration of the composition of data sent from a vector processing portion to a page memory drawing portion.
Figure 6:
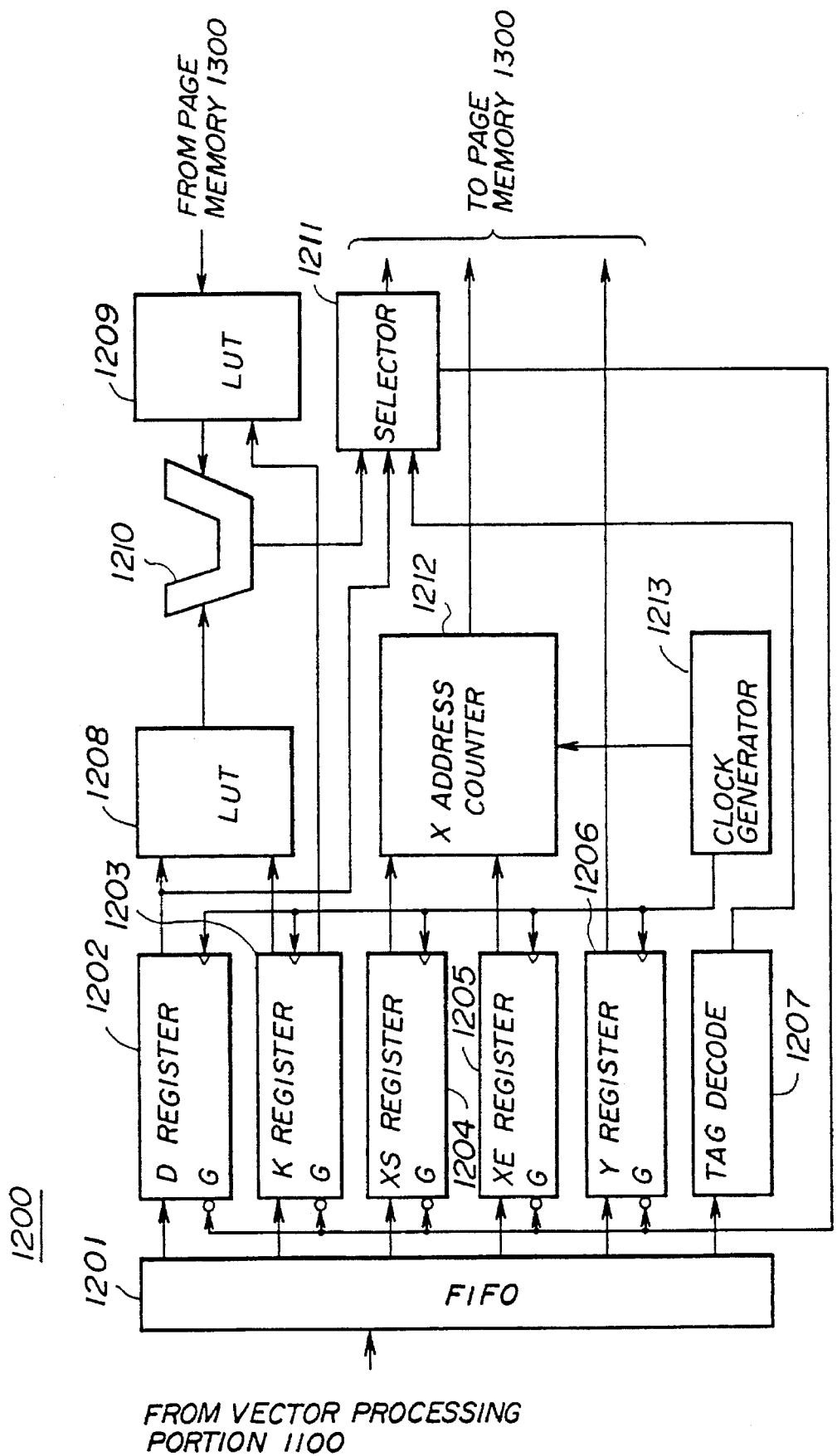
FIG. 6 shows a block diagram of a page memory drawing portion in the art related to the present invention.

Two embodiments according to the present invention are described below successively.

[A first embodiment]

The composition of a vector image drawing apparatus (an image drawing apparatus) of a first embodiment according to the present invention is described below with reference to FIG. 7. A document such as described in PDL language by application software of a computer or other data processing apparatus is supplied as vector data to a vector processing portion 100. The vector processing portion acts as area ratio calculation means. Then, the portion 100 executes a calculation of an area ratio by approximating the vector data by a straight line vector, the portion 100 then converts the vector data into straight line data for the scanning direction.

The area ratio of the vector data, and the straight line data for the scanning direction are supplied to a page memory drawing portion 200. The page memory drawing portion 200 acts as an image drawing means. The portion 200 then executes respective calculation of darkness values for each pixel, the portion 200 then draws an image in a below mentioned page memory 300.

The multi-value page memory 300 has a read-modify-write access capability. A coordinates conversion portion 400 executes a conversion between an absolute coordinates value and a relative coordinate values of the vector data. The coordinates conversion portion acts as coordinates conversion means. A font cache 500 memorizes the relative coordinates value and the area ratio as cache information. The font cache 500 acts as area ratio storing means.

The operation of the vector image drawing apparatus having the above mentioned composition as shown in FIG. 7 is described below. The vector processing portion 100 determines whether or not cache information of vector data identical to vector data which should be processed is stored in the font cache 500. Two cases are described below.

In a first case (I) where that cache information of vector data identical to vector data to be processed has not yet been stored there, the portion 100 sends the area ratio of the vector data and straight line data for the scanning direction to the page memory drawing portion 200, and the coordinates conversion portion 400 simultaneously converts the absolute coordinates value of the vector data into the corresponding relative coordinates value, and the font cache 500 then memorizes this converted relative coordinates value and the above mentioned area ratio of the vector data.

On the other hand, in a second case (II) where cache information of vector data identical to vector data to be processed has been already stored in the font cache 500, then neither a calculation for obtaining an area ratio nor a conversion to straight line data for the scanning direction are executed. But a relative coordinates value included in the above mentioned cache information is then converted into a corresponding absolute coordinates value. Then, the resulting absolute coordinates value and an area ratio from the cache information are sent to the page memory drawing portion 200, then the portion 200 draws a corresponding image in the page memory 300.

These operations corresponding to the two case (I) and (II) are described below in detail successively.

Figure 8A:
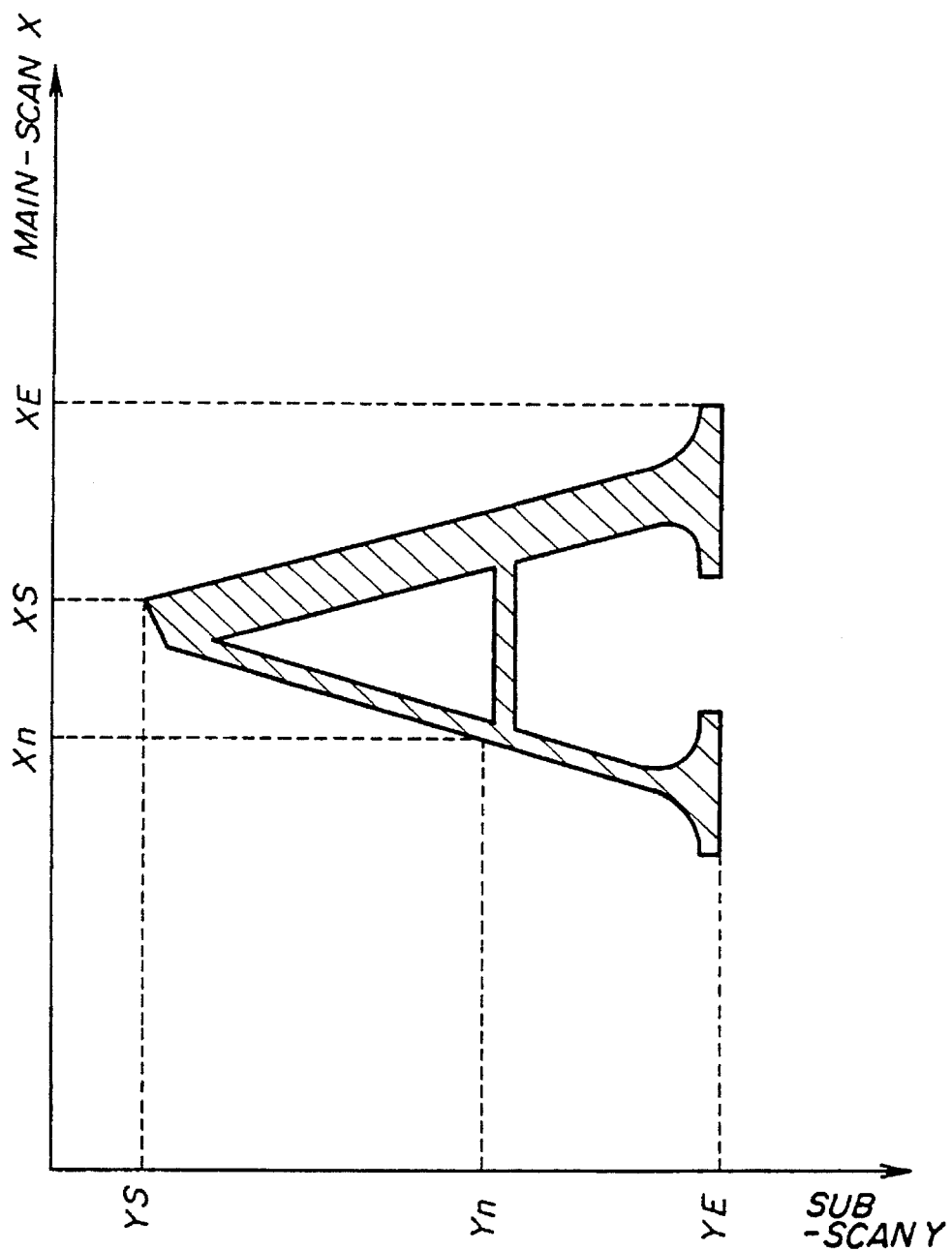
FIGS. 8A and 8B respectively show an illustration of one example of vector data and an illustration of an area ratio for each pixel.

(I) The first case where cache information of vector data identical to vector data to be processed has not yet been stored in the font cache 500:

When vector data for drawing a character "A" as shown in FIG. 8A is supplied, the vector processing portion 100 firstly approximates this vector data by straight lines, then the portion 100 calculates so as to obtain area ratios of edge part pixels of the vector data. Then an anti-aliasing process and scanline conversion (conversion into straight line data for the scanning direction) are executed for each line between the YS and YE coordinates of a sub-scanning direction in the example of the character "A" of FIG. 8A. That is, vector data processing for the character "A" in FIG. 8A is completed.

Figure 8B:
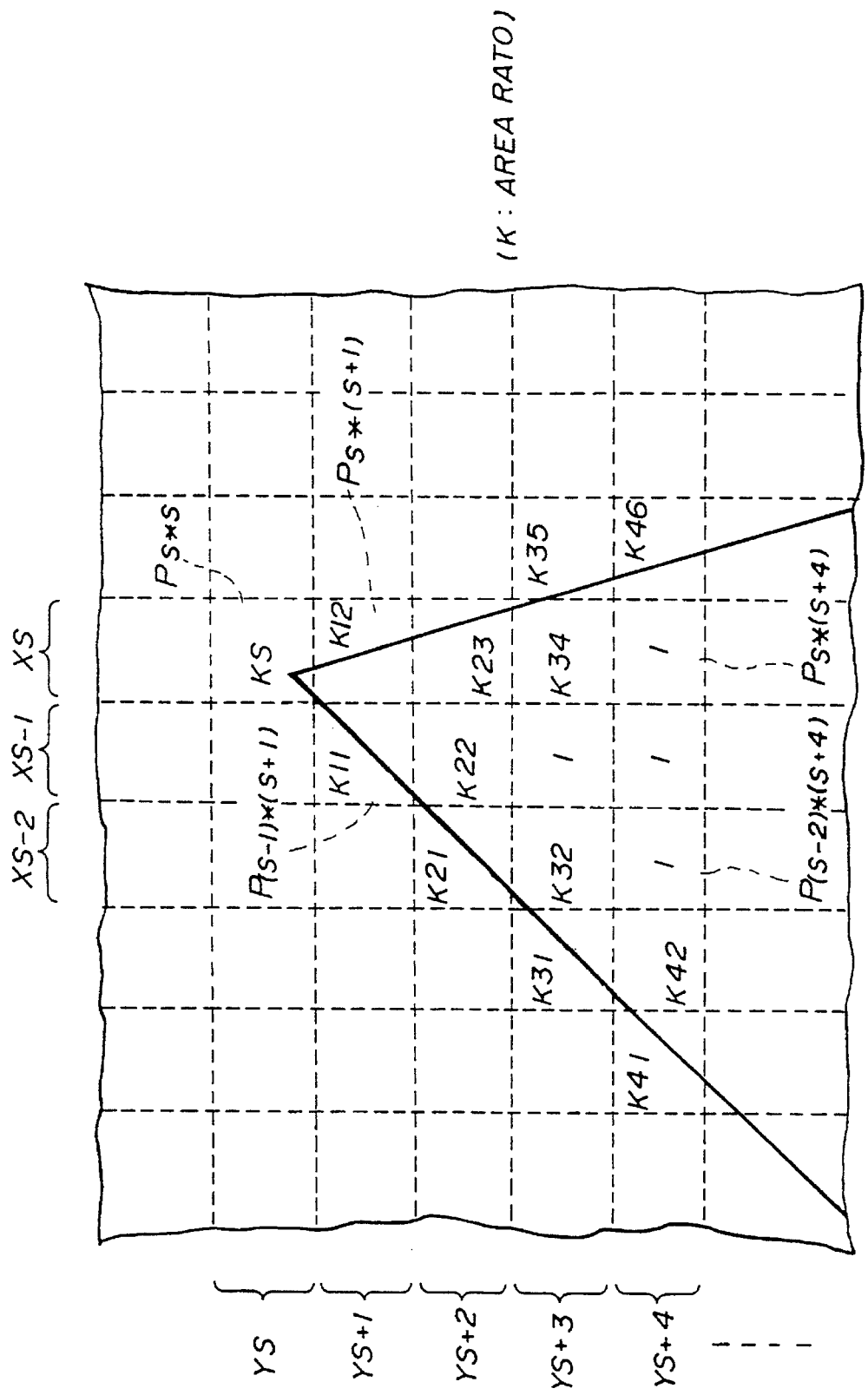

A pixel $P_{s*s}$ according to respective coordinates $(Y_S, X_S)$ as shown in FIG. 8B which pixel is located at the top of the character "A" of FIG. 8A is an edge part pixel, thus a calculation for obtaining an area ratio for anti-aliasing processing should be executed. A description of the method of calculation of an area ratio is omitted because the method is similar to that described above in BACKGROUND OF THE INVENTION. Then, after the execution of the above mentioned calculation, data such as the corresponding area ratio KS of the edge part pixel $P_{s*s}$, the corresponding absolute address XS of the main-scanning direction, and a corresponding absolute address YS of the sub-scanning direction is obtained.

The vector processing portion 100 then sends those obtained data (KS, XS, and YS) to the page memory drawing portion 200, and font cache 500 memorizes the data (KS, XS, and YS) as cache information simultaneously. However, the font cache 500 should memorize a relative address, thus, the main-scanning direction absolute address XS and subscanning direction absolute address YS are respectively converted into corresponding relative addresses before being memorized in the font cache 500.

The composition of the coordinates conversion portion 400 is described below with reference to FIG. 9. XS and YS are offset values, subtracters 401 and 402 then respectively subtract the offset addresses XS from respective absolute addresses X1 and X2, and then respective relative addresses x1 and x2 are obtained. Similarly, a subtracter 403 subtracts the offset address YS from an absolute address Y1, then a respective relative address y1 is obtained. In a method such as mentioned above, relative addresses with respect to an origin according to the coordinates (XS, YS) can be obtained.

Data (corresponding to the pixel $P_{s*s}$) to be written in accordance with the above mentioned manner in the font cache 500 for the first line corresponding to the coordinates YS) in FIG. 8B is described as follows: the starting coordinate of the main-scanning direction is "0"; the ending coordinate of the main-scanning direction is "0"; the coordinate of the sub-scanning direction is "0"(these three coordinates respectively corresponding to the above mentioned origin for relative coordinates); and the area ratio is "KS"

Relative addresses for the second line ( corresponding to coordinates YS+1, and pixels $P_{(s-1)*(s+1)}$, and $P_{s*(s+1)}$) can be obtained similarly. Then, the following data is written in the font cache 500 for the first pixel data (corresponding to the pixel $P_{(s-1)*(s+1)}$) for the second line: the starting coordinates of the main-scanning direction is "−1"; the ending coordinate of the main-scanning direction is "−1"; the coordinate of the sub-scanning direction is "1"; and the area ratio is "K11". The following data is written in the font cache 500 for the second pixel data (corresponding to the pixel $P_{s*(s+1)}$) for the second line: the starting coordinate of the main-scanning direction is "0"; the ending coordinate of the main-scanning direction is "0"; a coordinate of the sub-scanning direction is "1"; and the area ratio is "K12".

A coordinates conversion process such as mentioned above is then executed for the whole character "A" up to coordinates (YE, XE) in FIG. 8A, that is, the font expansion for the vector data of the character "A" is completed. However, area ratios with respect to pixels (for example, the pixel $P_{s*(s+4)}$ with coordinates (XS, YS+4)) other than edge part pixels are respectively to be "1", for which pixels other than edge part pixels an anti-aliasing process does not need to be performed, that is, for which pixels an area ratio does not need to be calculated. When a scan-line conversion is performed for a plurality of pixels, for example, a scan-line conversion for three pixels $P_{(s-2)*(s+4)}$ through $P_{s*(s+4)}$ of (XS−2) through (XS) in the YS+4 line, one pixel data is determined for the plurality of pixels, which pixel data has coordinates data such that the starting coordinate and ending coordinate in the main-scanning direction are different from each other.

Cache information for the example as shown in FIG. 8B stored in the font cache 500 is shown in FIG. 10. Data to be currently stored in the font cache 500 is written in a row currently indicated by a pointer PT. The pointer PT indicates the row (address least recently accessed out of either the row having data least recently written to it or the row having data least recently referred to after the cache 500 has become full, that is, there is no free row where current data can be written. This means that current data is written in the row (address) of the least recently accessed of either the row with the least recently written data or the row with the least recently read data, that is, the least recent data is erased when current data is written. Therefore, data often used remains and data seldom used is erased in the cache 500. Thus, an efficient usage of the cache 500 having a limited capacity can be realized.

(II) The second case where cache information of vector data identical to vector data to be processed has been already stored in the font cache 500:

When vector data which corresponds to data already stored in the font cache 500 is supplied, that is, the vector data currently supplied is the same as the vector data which has previously been supplied and thus already stored in the font cache 500, for example, vector data for the character "A" in FIG. 8A has been supplied once and vector data for the same character "A" is currently again supplied, the following operation is executed. The vector processing portion 100 does not execute a calculation for an area ratio, instead the portion 100 transfers a group of area ratios from the font cache 500 into the page memory drawing portion 200. Then, the starting coordinates of the current vector data are taken as offset addresses (XS, YS) for an image corresponding to the current vector data, and relative addresses stored in the font cache 500 are then converted into corresponding absolute addresses, and the obtained absolute addresses are then provided to the page memory drawing portion 200. Then, repeated writing of vector data for the same character "A" by means of the page memory drawing portion 200 can be realized.

In this case (II), in the coordinates conversion portion 400, the above mentioned offset addresses (XS, YS) of the current vector data are respectively added to relative addresses x1, x2, and y1 previously stored in the font cache 500 by means of respective adders 404, 405, and 406, absolute addresses Xstart, Xend, and Y are then obtained, and these obtained data are then sent to the page memory drawing portion 200.

An advantage of the vector image drawing apparatus of the first embodiment according to the present invention is described below. Duplicated calculations for obtaining area ratios with respect to the same image can be eliminated. This is because an area ratio once obtained by a corresponding calculation and relative addresses for the corresponding image are stored as cache information in the font cache 500. As a result of the advantage, processing speed can be improved. Further, it enables a reduced load to be applied to the CPU which is included in the vector processing portion 100.

[A second embodiment]

The composition of a vector image drawing apparatus of a second embodiment according to the present invention is described below with reference to FIG. 11. A document such as described in PDL language by application software of a computer or other data processing apparatus is supplied as vector data to a vector processing portion 600. Then, the portion 600 executes a calculation of an area ratio by approximating the vector data by a straight line vector, the portion 600 then converts the vector data into straight line data for the scanning direction.

The area ratio of the vector data, and the straight line data for the scanning direction are supplied to a page memory drawing portion 700. The portion 700 then executes respective calculations of darkness values for each pixel, the portion 700 then draws an image in a below mentioned page memory 800. The portion 700 has the function of two-dimensional bit-map data expansion.

The multi-value page memory 800 has a read-modify-write access capability. A font cache 900 memorizes the area ratios of the vector data as bit-map data, as cache information.

The operation of the vector image drawing apparatus having the above mentioned composition as shown in FIG. 11 is described below. The vector processing portion 600 determines whether or not cache information corresponding to vector data which should be currently processed is stored in the font cache 900. Two cases are described below.

In a first case (I) where that cache information (bit-map data) of vector data identical to vector data to be processed has not yet been stored there, the portion 600 sends the area ratio of the vector data and straight line data for the scanning direction to the page memory drawing portion 700, and the font cache 900 simultaneously memorizes the area ratios of the vector data as bit-map data.

On the other hand, in a second case (II) where the above mentioned cache information has been already stored in the font cache 900, then neither a calculation for obtaining an area ratio nor a conversion to straight line data for the scanning direction are executed. But the corresponding bit-map data is then sent from the font cache 900 to the page memory drawing portion 700. Then the portion 700 draws a corresponding image in the page memory 800. In this image drawing operation by the portion 700, data corresponding to the image is drawn on desirable addresses in the page memory 800, which addresses are directed by an operator.

These operations corresponding to the two case (I) and (II) are described below in detail successively.

Figure 12B:
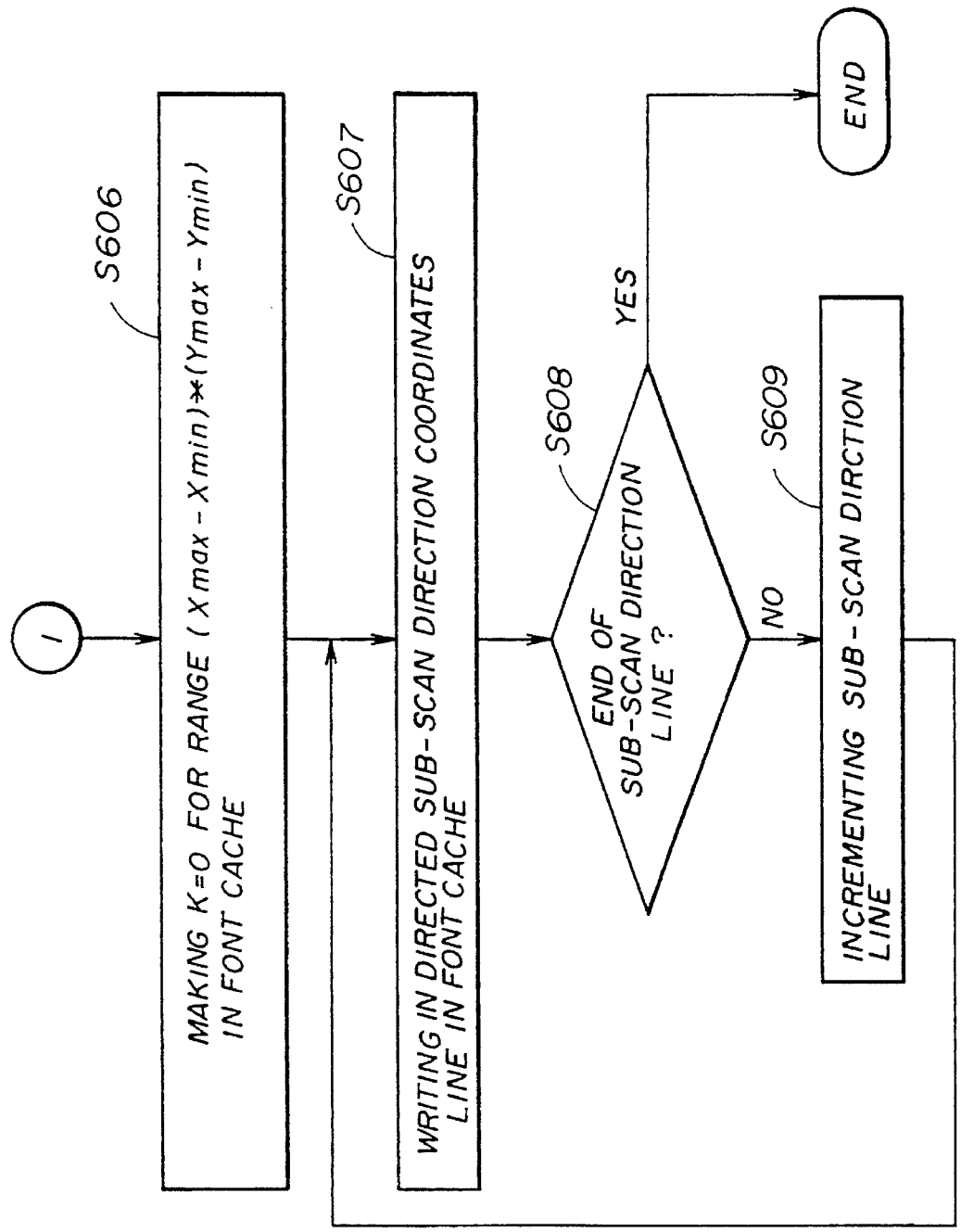

(I) In the first case where bit-map data cache information) of vector data identical to vector data to be processed has not yet been stored in the font cache 900:

The vector processing portion 600 then approximates a curved line included in the vector data by straight lines, the portion 600 then executes a calculation so as to obtain the area ratio of each edge part pixel, and the portion 600 then converts the vector data into straight line data for the scanning direction. Then the portion 600 sends the obtained data to the page memory drawing portion 700. The obtained area ratio is then expanded into a bit-map in the portion 700. This bit-map expansion is described below with reference to FIGS. 12A and 12B.

For the purpose of the bit-map expansion of vector data, straight line data for the scanning direction of the vector data which should be currently processed (in the form in which it is supplied to the page memory drawing portion 700) is stored in a buffer memory in step (the expression "step" is omitted hereinafter for the sake of simplicity) S601. Then, a sorting of pixels including elements of an image in a sequence such as from the minimum coordinates to maximum coordinates in the main-scanning direction (X-coordinates) is executed, the minimum value Xmin and the maximum value Xmax are then obtained (S602 and S603). Then, a sorting of pixels including elements of the image in a sequence such as from the minimum coordinates to maximum coordinates in the sub-scanning direction (Y-coordinates) is executed, the minimum value Ymin and the maximum value Ymax are then obtained (S604 and S605).

Figure 13A:
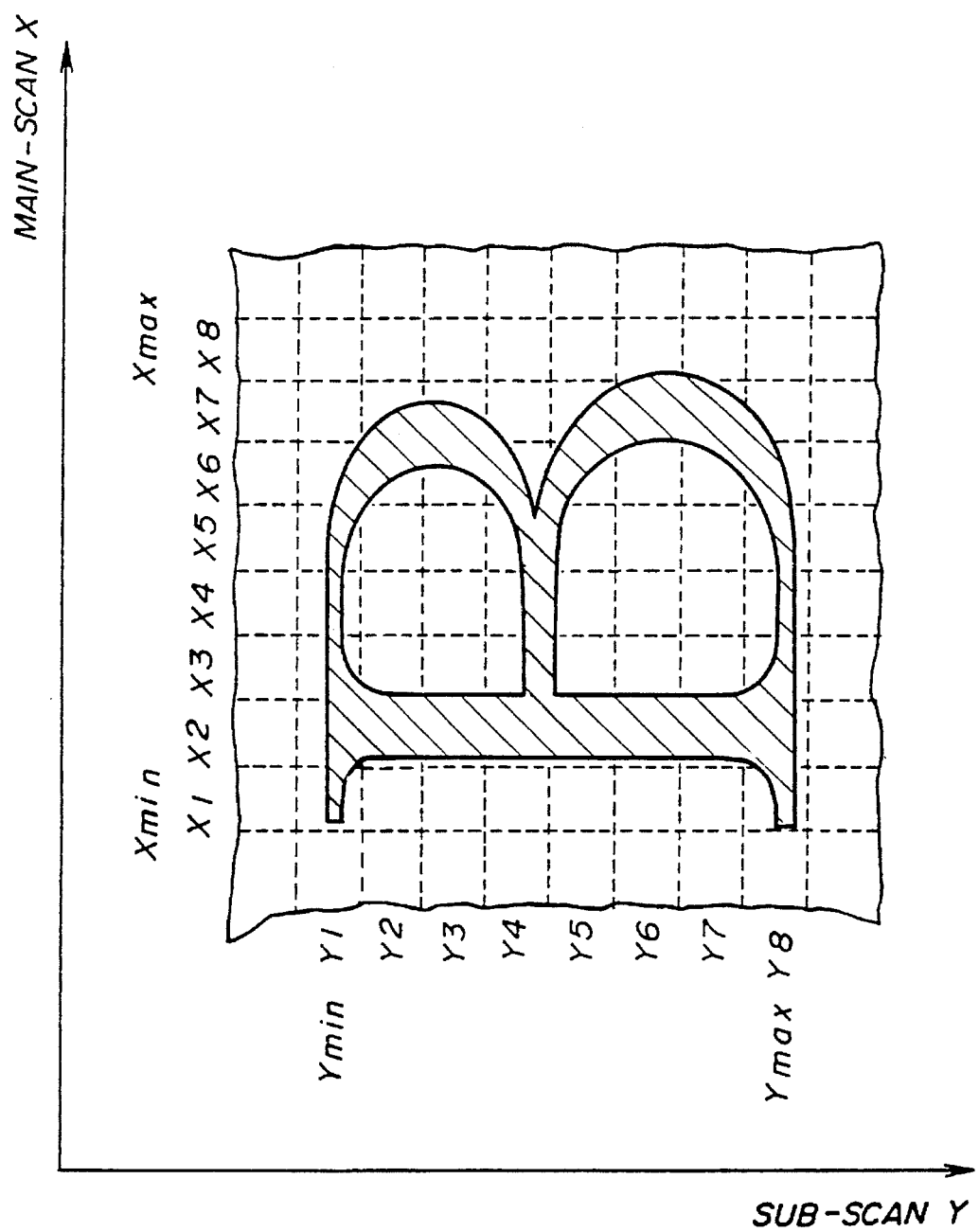

In case the where the current vector data is, for example, that shown in FIG. 13A of a character "B", then Xmin=X1; Xmax=XS; Ymin=Y1; and Ymax=Y8.

Then, for the purpose of painting out a background in a white color, area ratio K=0 is respectively written with respect to respective pixels in the range (Xmax-Xmin)*(Ymax-Ymin), that corresponds to a rectangular area between Xmax and Xmin in Xcoordinates, and Ymax and Ymin in Y-coordinates in the font cache 900 (S606).

Then the area ratios of pixels of an indicated line corresponding to each coordinate of the sub-scanning direction are successively written in the font cache 900 (S607), that is, for the example of FIG. 13B, the area ratios are K11 (X1) through "0" (X8) in the Y1 coordinates line. Such a writing process for each indicated coordinates line is then successively executed for lines corresponding to all coordinates of the sub-scanning direction so as to write area ratios for all pixels including elements of the image (S608 and S609). In the example of FIG. 13A (a character "B" area ratios for each pixels are shown in FIG. 13B, thus, the area ratios are written in the font cache 900 in a sequence of a pixel of coordinates (X1, Y1), (X2, Y1), ... (X7, Y1), (X2, Y2), ..., up to (X7, Y8).

In the above mentioned process, pixels having an area ratio of "0" are not written in the process from S607 to S609 because these pixels are already written in the S606, and also data of a pixel having an area ratio of "0" is not generated in the calculation of area ratios in the vector processing portion 600. Further, area ratios of pixels other than edge part pixels, that is, of pixels to be painted-out-in-darkness, are determined to be "1"

Figure 14:
FIG. 14 shows an illustration of the composition of bit-map data as cache information stored in a font cache of the second embodiment according to the present invention.

One example of data written in the font cache 900 as mentioned above is shown in FIG. 14. Data to be currently stored in the font cache 900 is written in a row currently indicated by a pointer PT. The pointer PT indicates the row (address) least recently accessed out of either the row having data least recently written to it or the row having data least recently referred to after the cache 900 has become full. This means that current data is written in the row (address) of the least recently accessed of either the row with the least recently written data or the row with the least recently read data, that is, the least recent data is erased when current data is written. Therefore, data often used remains and data seldom used is erased in the cache 900. Thus, an efficient usage of the cache 900 having a limited capacity can be realized.

Figure 15:
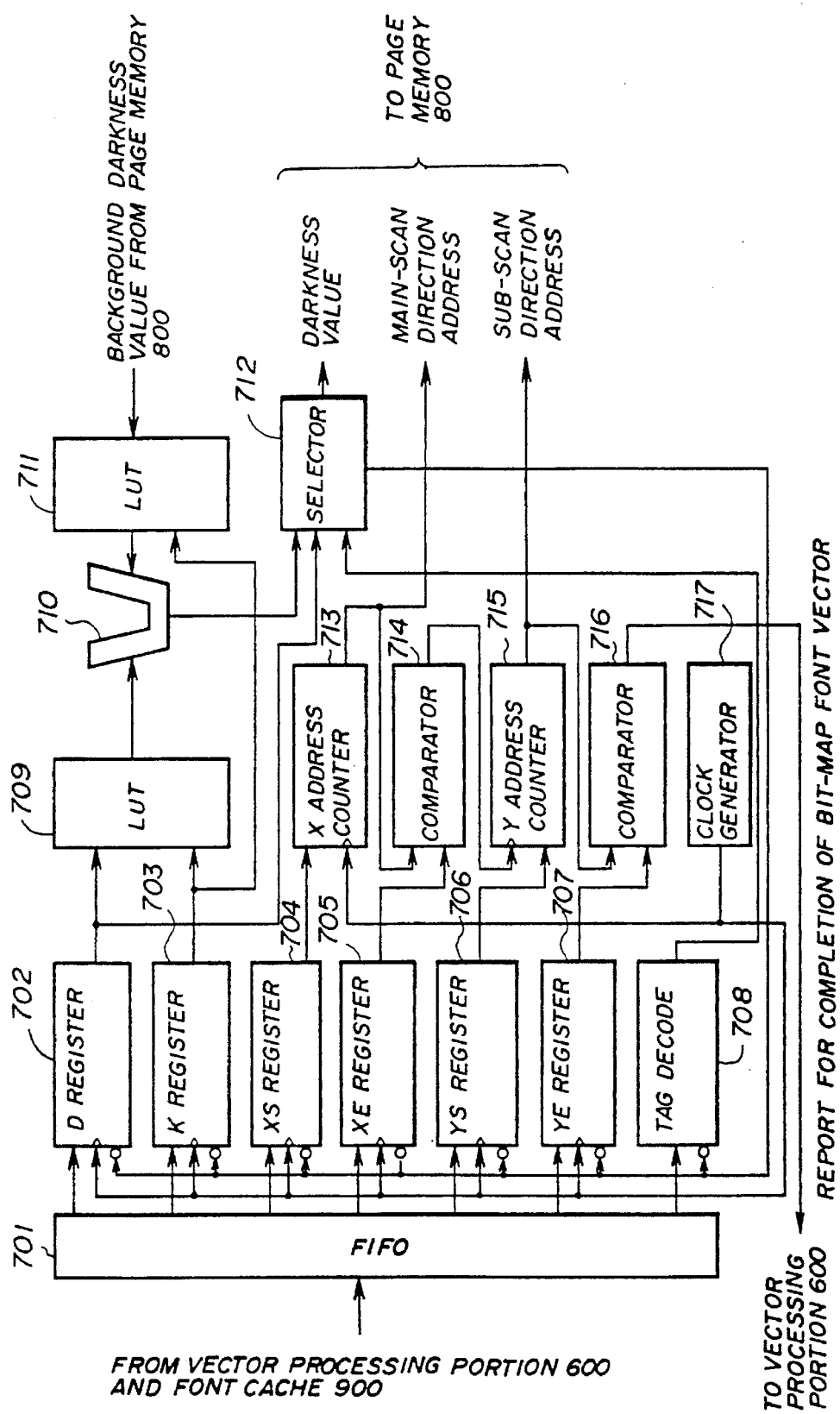
FIG. 15 shows a block diagram of a page memory drawing portion of the second embodiment according to the present invention.

The composition of the page memory drawing portion 700 is described below with reference to FIG. 15. All data supplied from the vector processing portion 600 to the page memory drawing portion 700 are applied through FIFO 701. The TAG bit is determined by TAG decode 708. Then a determination of whether or not an anti-aliasing process should be performed on the data is executed, then a distribution of the data into each register of D register 702, K register 703, XS register 704, XE register 705, Y register 706, and YE register 707 is executed.

If an anti-aliasing process should be performed, LUT (look up table) 709 multiplies the area ratio latched in the K register 703 by the reference figure darkness value latched in the D register 702. Another LUT 711 reads the darkness value (background color) which has been previously written (painted) in the page memory 800, then $K_0$ $K_0=1-(\text{area ratio})$ is multiplied by the background color. Further, An adder 710 then adds the results of the multiplications of both LUT 709 and 711 together. If an overflow arises during such addition, the result of the addition is set to be the maximum darkness value (all bits are "1").

That is, a calculation by using read-modify-write-accessing with the page memory 800, which calculation is the darkness-determination process of the anti-aliasing, is executed.

A printer darkness value obtained as mentioned above is written in the page memory 800 at an address directed by the respective coordinates of the main-scanning direction and the sub-scanning direction. In the case of a painting-out-in-darkness process of a scan-line, X address counter 713 counts from a starting address XS to an ending address XE in the main-scanning direction, the counter 713 increments the address one by one with synchronization to a pixel clock provided from a clock generator 717, and then the counter 713 executes a painting-out-in-darkness process for each pixel successively. A selector 712 is then switched so that darkness values provided from the D register 702 can be written without alteration to the page memory 800 for the painting-out-in-darkness process for a scan-line.

The above mentioned processing is completed for all vector data for one page. Thus an image for the page is written in the page memory 800. Then, after a printing command in PDL language is executed, the page memory 800 sends stored image data (multivalue image data) to an output apparatus such as a multi-value color laser printer or other printer, thus printing via the output apparatus.

(II) The second case where cache information (bit-map data) of vector data identical to vector data to be processed has been already stored in the font cache 900:

When vector data which corresponds to data already stored in the font cache 900 is supplied, that is, the vector data currently supplied is the same as the vector data which has previously been supplied and thus already stored in the font cache 900, for example, vector data for the character "B" in FIG. 13A has been supplied once and vector data for the same character "B" is currently again supplied, the following operation is executed. The vector processing portion 600 does not execute a calculation for an area ratio, instead the portion 600 transfers a group of area ratios as a bit-map from the font cache 900 into the page memory drawing portion 700.

In the page memory drawing portion 700, because data corresponding to the bit-map stored in font cache 900 has the construction of a rectangular-shaped area AR (that is, the data describes addresses in two dimensions) as shown in FIG. 16, which area includes an image of the corresponding vector data to be drawn, two points (XS, YS) and (XE, YE) are designated. These points are obtained from bit-map data stored in the font cache 900 by the following relationship to the data: XS=Xmin; XE=Xmax; YS=Ymin; and YE=Ymax.

When process for all pixels in a line of coordinates of the sub-scanning direction, which line is currently processed, is completed, that is, for the example of FIG. 13B, pixels K11 (X1) through "0" (X8) in a line Y1, the following operation is then executed. Y address counter (that is, the address counter for the sub-scanning direction) 715 is incremented, and the address to be processed changed to be XS of the next line. When, after repeated processes such as mentioned above, the last pixel of the last line, that is, for the example of FIG. 13B, a pixel of coordinates (XE, YE), is processed, a comparator 716 then provides a vector completion report which indicates a completion of drawing of vectors which have been expand into the bit-map.

Therefore, a font cache containing data obtained as a result of a bit-map expansion can be used because a vector drawing apparatus comprises a page memory drawing portion such as mentioned above with reference to FIG. 15. Further, drawing of one unit of vector data, for example, the vector data of the character "B" as shown in FIG. 13A, can be enabled by an operation of the vector processing portion 600, which operation consists of designation of two points of corresponding coordinates, that is, for the example of FIGS. 13A and 13B, the two points (XS, YS) and (XE, YE).

An advantage of the vector image drawing apparatus of the second embodiment according to the present invention is described below. Duplicated calculations for obtaining an area ratio with respect to the same image can be eliminated. This is because an area ratio once obtained by a corresponding calculation and relative addresses for the corresponding image are stored as bit-map data, as cache information in the font cache 900. As a result of the advantage, processing speed can be improved. Further, it enables a reduced load to be applied to the CPU which is included in the vector processing portion 600. Further, drawing of an image can be enabled by designating only two points corresponding to a rectangular area.

Further, the present invention is not limited to the above described embodiments, and variations and modifications may be made without departing from the scope of the present invention.

What is claimed is

1. An image drawing apparatus, comprising:
   a) area ratio calculation means for calculating an area ratio of a pixel constituting an image corresponding to supplied image data if said area ratio corresponding to said supplied image data has not yet been stored in an area ratio storing means, said area ratio corresponding to an area occupied by said image represented by said supplied image data;
   b) said area ratio storing means for storing said area ratio therein; and
   c) image drawing means for drawing an image corresponding to supplied image data by providing a pixel darkness value corresponding to the area ratio of a pixel constituting said image represented by said supplied image data;

wherein:
   1a) said area ratio is obtained with reference to said area ratio storing means if said area ratio of a pixel constituting an image identical to said image represented by said supplied image data has already been stored in said are ratio storing means; or
   1b) said area ratio is obtained as a result of calculating by means of said area ratio calculation means if an area ratio of a pixel constituting an image identical to said image represented by said supplied image data has not been stored in said area ratio storing means; and wherein:
   2) said area ratio calculation means and said area ratio storing means ensure that storage of area ratios in said area ratio storing means prevents said area ratio calculation means from duplicate calculation of area ratios.

2. The image drawing apparatus according to claim 1, wherein said area ratio calculation means provides the area ratio of a pixel as a straight line data for each scan-line, said straight line data comprising separate data value for each pixel if area ratios of said pixels located adjacent to each other along the running direction of said scan-line are different from each other, or comprising one data for all pixels if area ratios of said pixels located adjacent to each other along the running direction of said scan-line are the same as each other.

3. The image drawing apparatus according to claim 1, wherein said area ratio storing means stores an area ratio such that said area ratio is written at an address therein which is the least recently accessed if an unused address does not remain at which to write.

4. The image drawing apparatus according to claim 1, wherein said area ratio storing means stores an area ratio such that said area ratio is written at an address therein which is the least recent of either the least recently written or least recently read if an unused address does not remain at which to write.

5. The image drawing apparatus according to claim 1, wherein said area ratio calculation means calculates an area ratio using straight lines after approximating a curved line constituting an edge of an image by appropriate said straight lines.

6. The image drawing apparatus according to claim 1, further comprising coordinate conversion means for converting absolute coordinate data of a pixel into relative coordinate data of said pixel, an area ratio of said pixel being obtained by said area ratio calculation means, said relative coordinate data of said pixel then being stored in said area ratio storing means, and said coordinate conversion means converting said relative coordinate data of said pixel stored in said area ratio storing means into said absolute coordinate data of said pixel so as to provide it to said image drawing means when said area ratio of said pixel is referenced by said image drawing means; and said image drawing means drawing an image by providing a pixel darkness value corresponding to said area ratio of said pixel with corresponding said absolute coordinate data of said pixel.

7. The image drawing apparatus according to claim 1, wherein:
   said image drawing means draws an image by providing pixel darkness values, corresponding to the respective area ratios of the pixels to be scanned, as bit-map data where said pixel darkness values are respectively located in a sequence corresponding to the coordinates of the pixels;
   said area ratio storing means stores respective area ratios of each pixel to be scanned as bit-map data where said area ratios are respectively located in a sequence corresponding to the coordinates of the pixels, said respective area ratios including area ratios obtained from said area ratio calculation means; and
   said image drawing means draws an image corresponding to supplied image data by referring to the bit-map data (of respective area ratios of the pixels constituting said image corresponding to said supplied image data stored in said area ratio storing means) if said bit-map data of a respective area ratio of a pixel constituting an image identical to said image corresponding to said supplied image data has been already stored in said area ratio storing means, or by referring to the respective area ratio obtained as a result of calculation by means of said area ratio calculation means if bit-map data of a respective area ratio of a pixel constituting an image identical to said image corresponding to said supplied image data has not yet been stored in said area ratio storing means.

8. An image drawing method, comprising:
   (a) calculating an area ratio of a pixel constituting an image corresponding to supplied image data if said area ratio corresponding to said supplied image data has not yet been stored in an area ratio storing means, said area ratio corresponding to an area occupied by said image corresponding to said supplied image data;
   (b) storing said area ratio in said area ratio storing means; and
   (c) drawing an image corresponding to supplied image data by providing a pixel darkness value corresponding to the area ratio of a pixel constituting said image corresponding to said supplied image data;

wherein:
   1a) said area ratio is obtained by reference to said area ratio storing means if said area ratio of a pixel constituting an image identical to said image corresponding to said supplied image data has already been stored in said are ratio storing means; or 1b) said area ratio is obtained as a result of calculation by said step (a) if an area ratio of a pixel constituting an image identical to said image corresponding to said supplied image data has not been stored in said area ratio storing means; and wherein;

2) said step (a) of calculating an area ratio and said area ratio storing means ensure that storage of area ratios in said area ratio storing means prevents said area ratio calculation step (a) from duplicate calculation of area ratios.

9. The image drawing method according to claim 8, wherein said step (a) provides the area ratio of a pixel as a straight line data for each scan-line, said straight line data comprising a separate data value for each pixel if the area ratios of said pixels located adjacent to each other along the Punning direction of said scan-line are different from each other, or comprising one data value for all pixels if the area ratios of said pixels located adjacent to each other along the Punning direction of said scanline are the same as each other.

10. The image drawing method according to claim 8, wherein said area ratio storing means stores an area ratio so as to write said area ratio at an address therein which is least recently accessed if an unused address does not remain at which to write.

11. The image drawing method according to claim 8, wherein said area ratio storing means stores an area ratio so as to write said area ratio at an address therein which is the least recent of either the least recently written or least recently read if an unused address does not remain at which to write.

12. The image drawing method according to claim 8, wherein said area ratio calculation means calculates an area ratio using straight lines after approximating a curved line constituting an edge of an image by appropriate said straight lines.

13. The image drawing method according to claim 8, further comprising a step (d-1) converting absolute coordinate data of a pixel into relative coordinate data of said pixel, an area ratio of said pixel being obtained by said step (a), said relative coordinate data of said pixel then being stored in said area ratio storing means, and a step (d-2) converting said relative coordinate data of said pixel stored in said area ratio storing means into said absolute coordinate data of said pixel so as to provide it to said step (c) when said area ratio of said pixel is referenced in said step (c); and said step (c) drawing an image by providing a pixel darkness value corresponding to said area ratio of said pixel with corresponding said absolute coordinate data of said pixel.

14. The image drawing method according to claim 1, wherein:

said step (c) draws an image by providing respective pixel darkness values, corresponding to the respective area ratios of the pixel to be scanned, as bit-map data where said pixel darkness values are respectively located in a sequence corresponding to the coordinates of the pixels;

said area ratio storing means stores respective area ratios of each pixel to be scanned as bit-map data where said area ratios are respectively located in a sequence corresponding to the coordinates of the pixels, said respective area ratios including area ratios obtained from said step (a); and said step (c) draws an image corresponding to supplied image data by referring to the bit-map data (of respective area ratios of the pixels constituting said image corresponding to said supplied image data stored in said area ratio storing means) if said bit-map data of a respective area ratio of a pixel constituting an image identical to said image corresponding to said supplied image data has been already stored in said area ratio storing means, or by referring to the respective area ratio obtained as a result of calculation by said step (a) if bit-map data of a respective area ratio of a pixel constituting an image identical to said image corresponding to said supplied image data has not yet been stored in said area ratio storing means.

15. An image drawing apparatus, comprising:

a) area ratio calculation means for calculating an area ratio image data, the area ratio corresponding to an area occupied by the image;

b) image drawing means for drawing an image corresponding to the supplied image data, by providing a pixel darkness value corresponding to the area ratio; and c) area ratio storing means for storing said area ratio;

wherein said area ratio calculation means and said area ratio storing means ensure that storage of area ratios in said area ratio storing means prevents said area ratio calculation means from duplicate calculation of area ratios.

16. The apparatus of claim 15, wherein: the area ratio storing means includes a cache; and the image drawing means constitutes means for using the area ratio, stored in the area ratio storing means, in a future image drawing operation.

17. The apparatus of claim 15, wherein: the supplied image data includes text data.

18. The apparatus of claim 17, wherein the image drawing means includes:

means for using the area ratio to perform an anti-aliasing operation on an edge portion of a character represented by the text data.

19. An image drawing method, comprising:

a) calculating an area ratio of a pixel constituting an image corresponding to supplied image data, the area ratio corresponding to an area occupied by the image;

b) drawing an image corresponding to the supplied image data by providing a pixel darkness value corresponding to the area ratio; and c) storing the area ratio in an area ratio storing means;

wherein said step (a) of calculating an area ratio and said area ratio storing means ensure that storage of area ratios in said area ratio storing means prevents said area ratio calculation stem (a) from duplicate calculation of area ratios.

20. The method of claim 16, wherein:

the storing step (c) includes using a cache for storing the area ratio; and the method further comprises using the area ratio, stored in the area ratio storing means, for a future image drawing operation.

21. The method of claim 19, wherein: the supplied image data includes text data.

22. The method of claim 21, wherein the drawing step (b) includes:

using the area ratio to perform an anti-aliasing operation on an edge portion of a character represented by the text data.

* * * * *